(12) United States Patent
Saunders

(10) Patent No.: US 8,701,814 B2
(45) Date of Patent: Apr. 22, 2014

(54) CONCEALMENT APPARATUS FOR IGNITION INTERLOCK DEVICES

(75) Inventor: Barry Saunders, Scottsdale, AZ (US)

(73) Assignee: Capital Logistics, Inc., Carson City, NV (US)

( * ) Notice: Subject to any disclaimer, the term of this patent is extended or adjusted under 35 U.S.C. 154(b) by 0 days.

(21) Appl. No.: 13/565,514

(22) Filed: Aug. 2, 2012

(65) Prior Publication Data

US 2013/0062232 A1 Mar. 14, 2013

Related U.S. Application Data

(63) Continuation-in-part of application No. 13/249,599, filed on Sep. 30, 2011, now abandoned, and a continuation-in-part of application No. 29/416,713, filed on Mar. 26, 2012.

(60) Provisional application No. 61/533,352, filed on Sep. 12, 2011.

(51) Int. Cl.
*B60K 28/00* (2006.01)

(52) U.S. Cl.
USPC ............. 180/272; 206/305; 422/84; 340/576; 73/23.3

(58) Field of Classification Search
CPC . B60K 28/06; B60K 28/063; B60W 2540/24; G01N 33/497; G01N 33/98
USPC ............. 180/272; 600/532; 73/23.3; 422/84; 340/426.11, 426.24, 576; 206/305, 206/217.588, 594; 220/495.01, 495.03
See application file for complete search history.

(56) References Cited

U.S. PATENT DOCUMENTS

| | | | |
|---|---|---|---|
| 3,435,946 A | 4/1969 | Sobek et al. | |
| 5,002,184 A | 3/1991 | Lloyd | |
| 5,312,013 A | 5/1994 | Bridges | |
| 5,388,692 A | 2/1995 | Withrow et al. | |
| 5,484,063 A | 1/1996 | Cuccio et al. | |
| 5,531,225 A | 7/1996 | Nawata et al. | |
| 5,553,444 A | 9/1996 | Lovecky et al. | |
| 6,092,707 A | 7/2000 | Bowes, Jr. | |
| 6,123,198 A | 9/2000 | Pflueger et al. | |
| 6,170,318 B1 | 1/2001 | Lewis | |
| 6,205,040 B1 | 3/2001 | Teichmann | |
| 6,785,566 B1 | 8/2004 | Irizarry | |
| 7,279,132 B2 | 10/2007 | Sultan et al. | |
| 7,377,186 B2 | 5/2008 | Duval | |
| 7,422,723 B1 | 9/2008 | Betsill | |
| 7,451,852 B2 | 11/2008 | Stewart et al. | |
| 7,736,903 B2 | 6/2010 | Lambert et al. | |
| 8,418,796 B2 * | 4/2013 | Flores | 180/272 |
| 2004/0094549 A1 * | 5/2004 | Ryan et al. | 220/254.1 |

(Continued)

OTHER PUBLICATIONS

Breathalyzer/Ignition Interlock Device Camouflage! : Retrieved from : http//cgi.ebay.com/Breathalyzer-Ignition-Interlock-Device-Camouflage-/320672729463, Jun. 29, 2011; 3 pages.

*Primary Examiner* — Ruth Ilan
(74) *Attorney, Agent, or Firm* — Myers Bigel Sibley & Sajovec, P.A.

(57) ABSTRACT

A concealment apparatus for an ignition interlock device includes a container defining a cavity with an open upper end, and a lid covering the open upper end. The cavity is configured to receive and conceal an ignition interlock device, such as a handheld ignition interlock device. The apparatus may be configured to resemble a beverage container.

29 Claims, 27 Drawing Sheets

(56) References Cited

U.S. PATENT DOCUMENTS

| | | |
|---|---|---|
| 2005/0009195 A1 | 1/2005 | Wang |
| 2006/0016278 A1 | 1/2006 | Duval |
| 2006/0033628 A1 | 2/2006 | Duval |
| 2006/0206034 A1 | 9/2006 | Stock et al. |
| 2006/0217625 A1 | 9/2006 | Forrester, Jr. |
| 2006/0274493 A1 | 12/2006 | Richardson et al. |
| 2009/0078712 A1 | 3/2009 | Zimmerman |
| 2010/0012417 A1 | 1/2010 | Walter et al. |
| 2010/0063408 A1 | 3/2010 | Nothacker et al. |
| 2010/0269566 A1 | 10/2010 | Carroll |
| 2011/0050407 A1 | 3/2011 | Schoenfeld |
| 2011/0079073 A1 | 4/2011 | Keays |
| 2012/0031166 A1 | 2/2012 | Lopez et al. |
| 2012/0048753 A1 | 3/2012 | Johnson-Griggs |
| 2012/0075094 A1 | 3/2012 | Keays |
| 2012/0118769 A1 | 5/2012 | Conner et al. |
| 2012/0234708 A1 | 9/2012 | Chabot |
| 2012/0244371 A1 | 9/2012 | Flores |

* cited by examiner

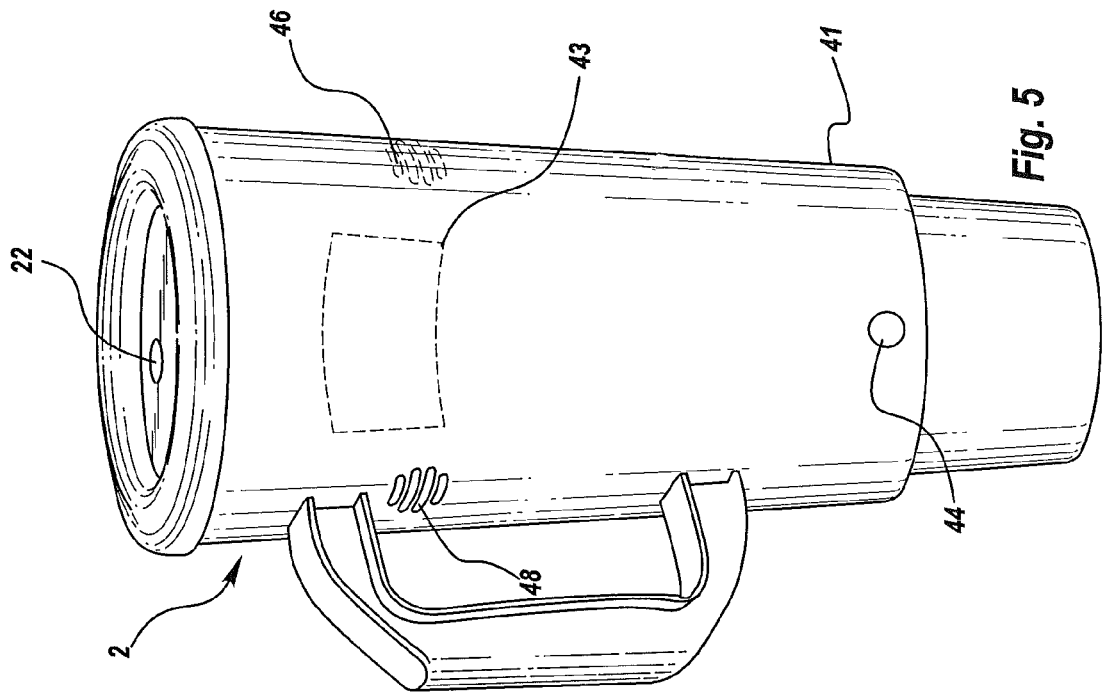
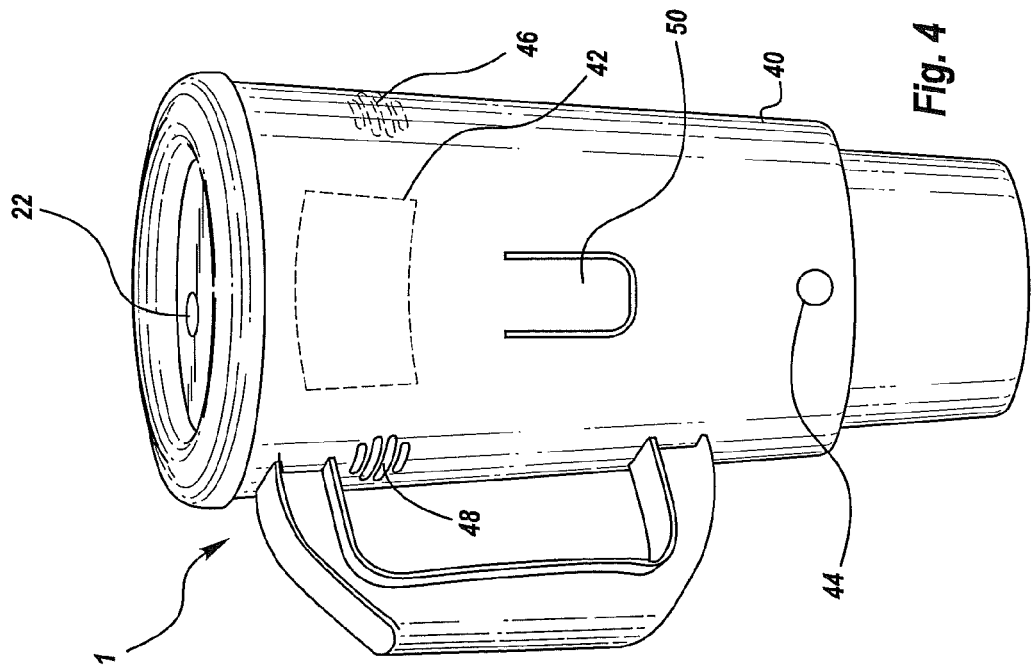

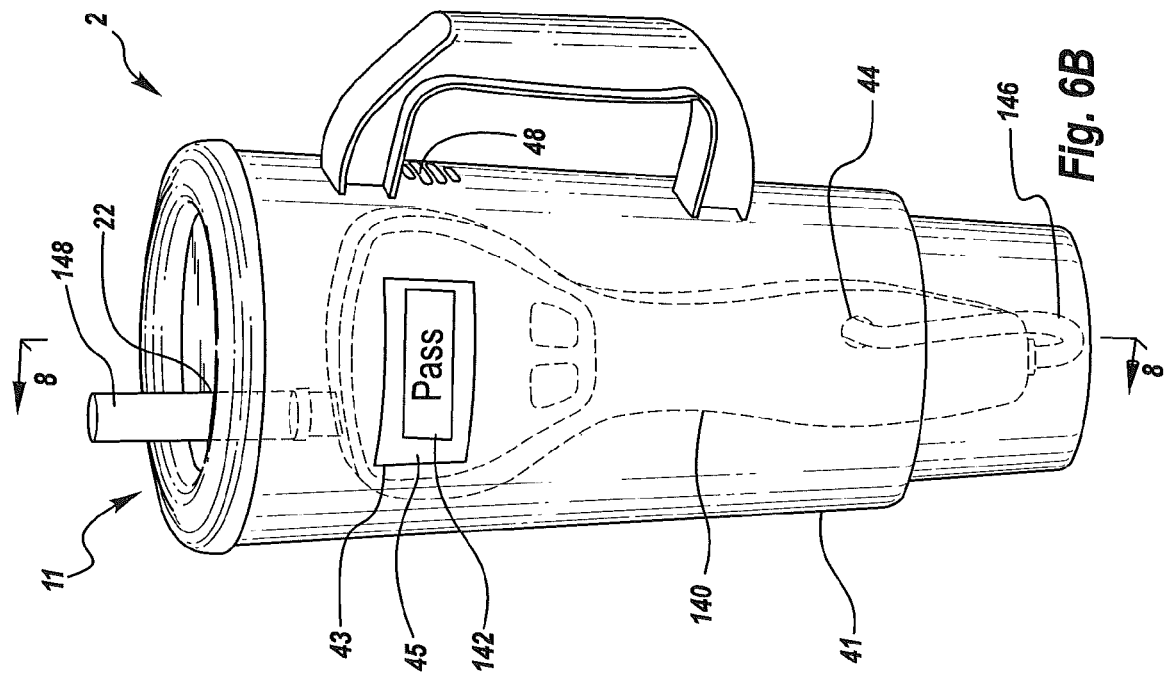
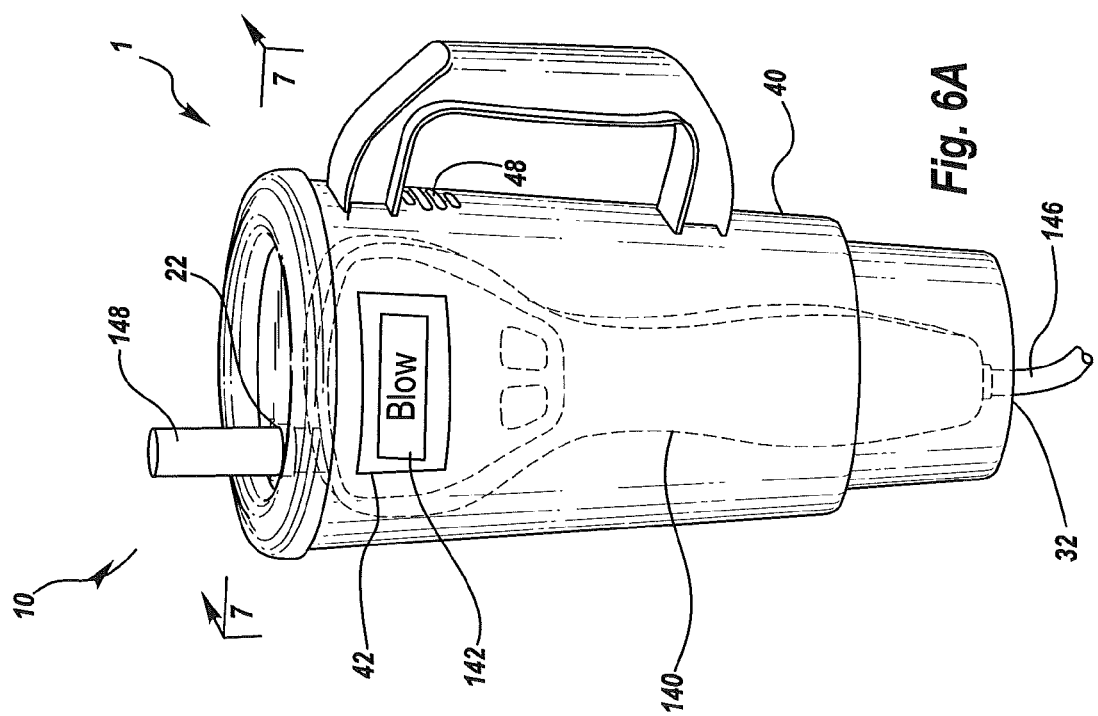

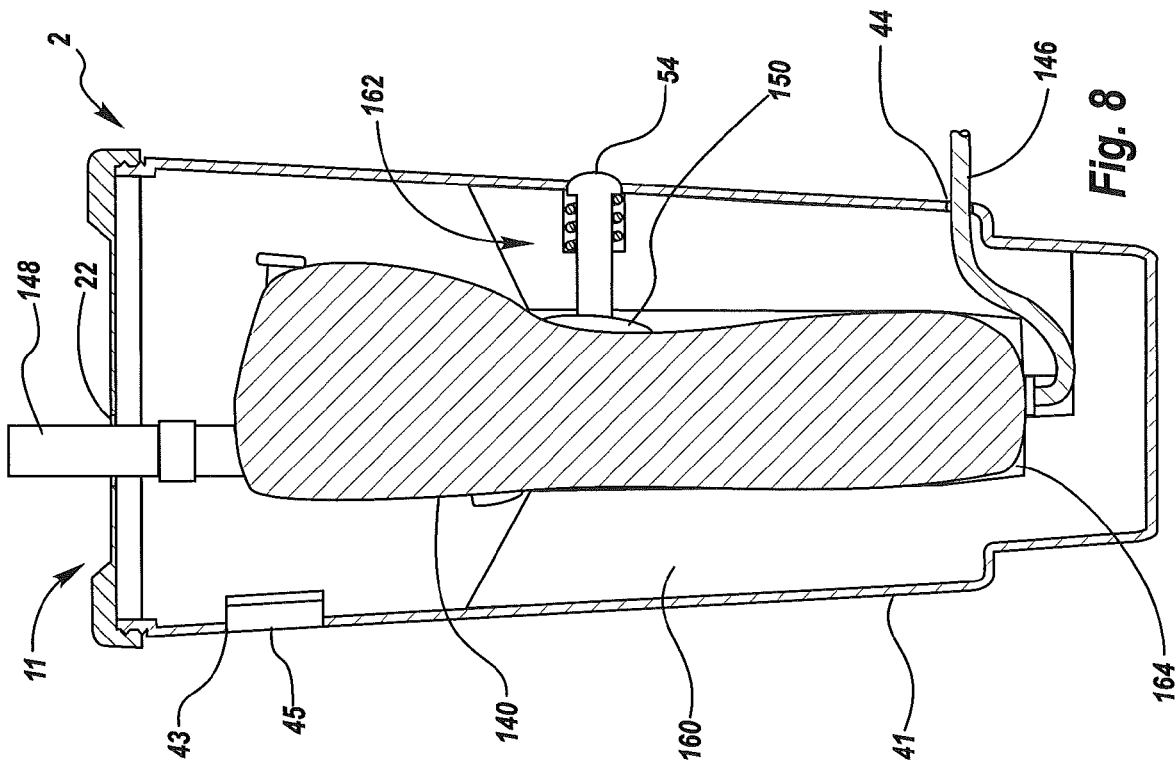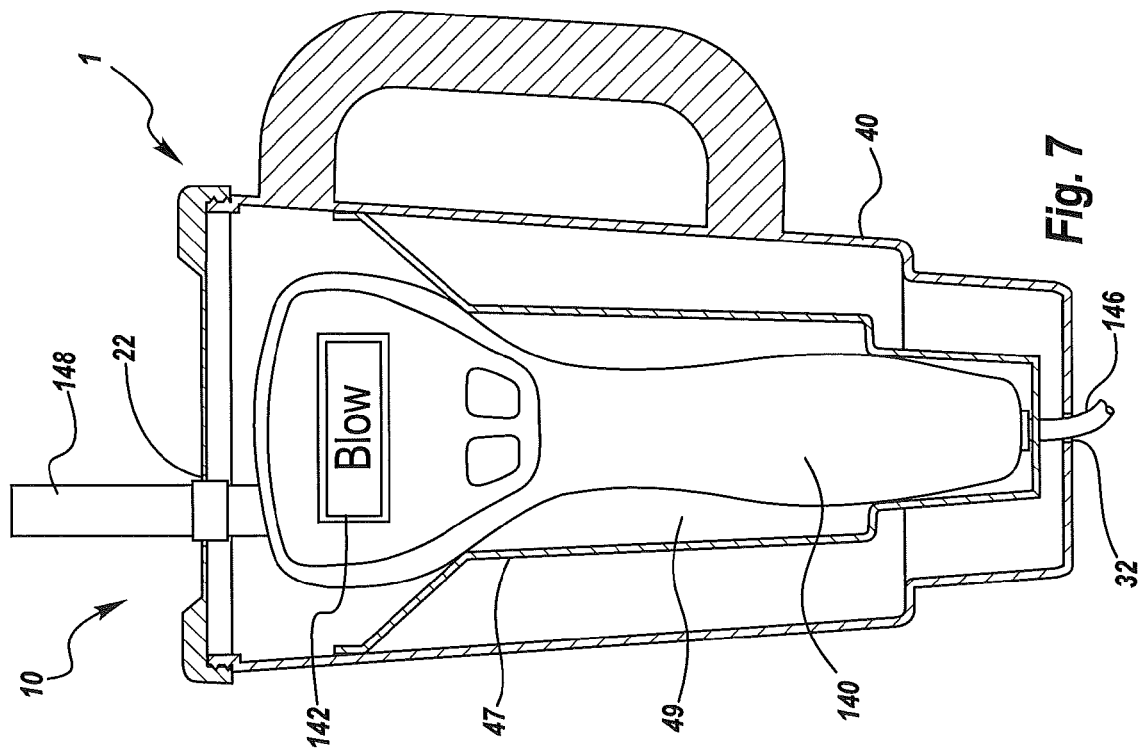

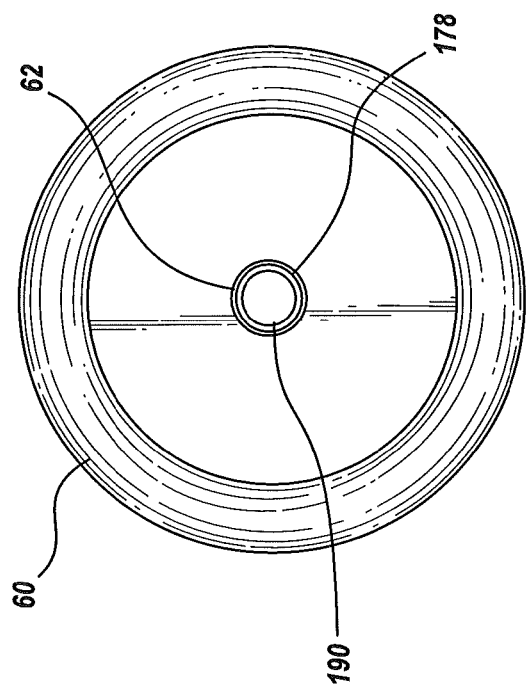
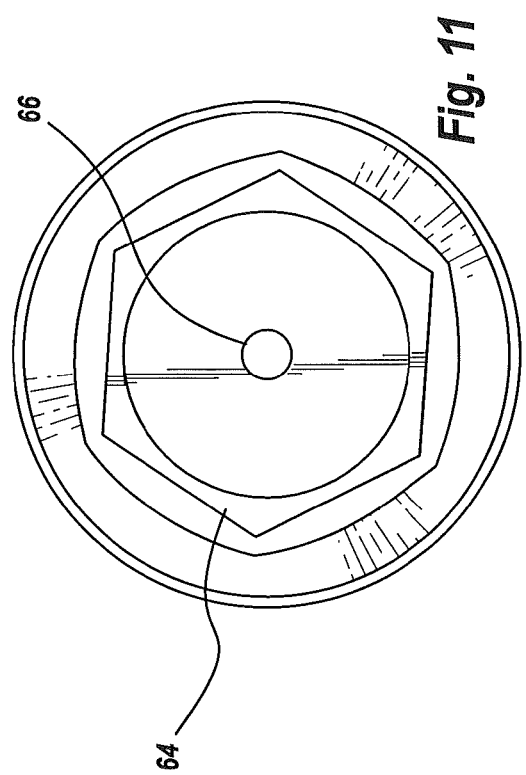
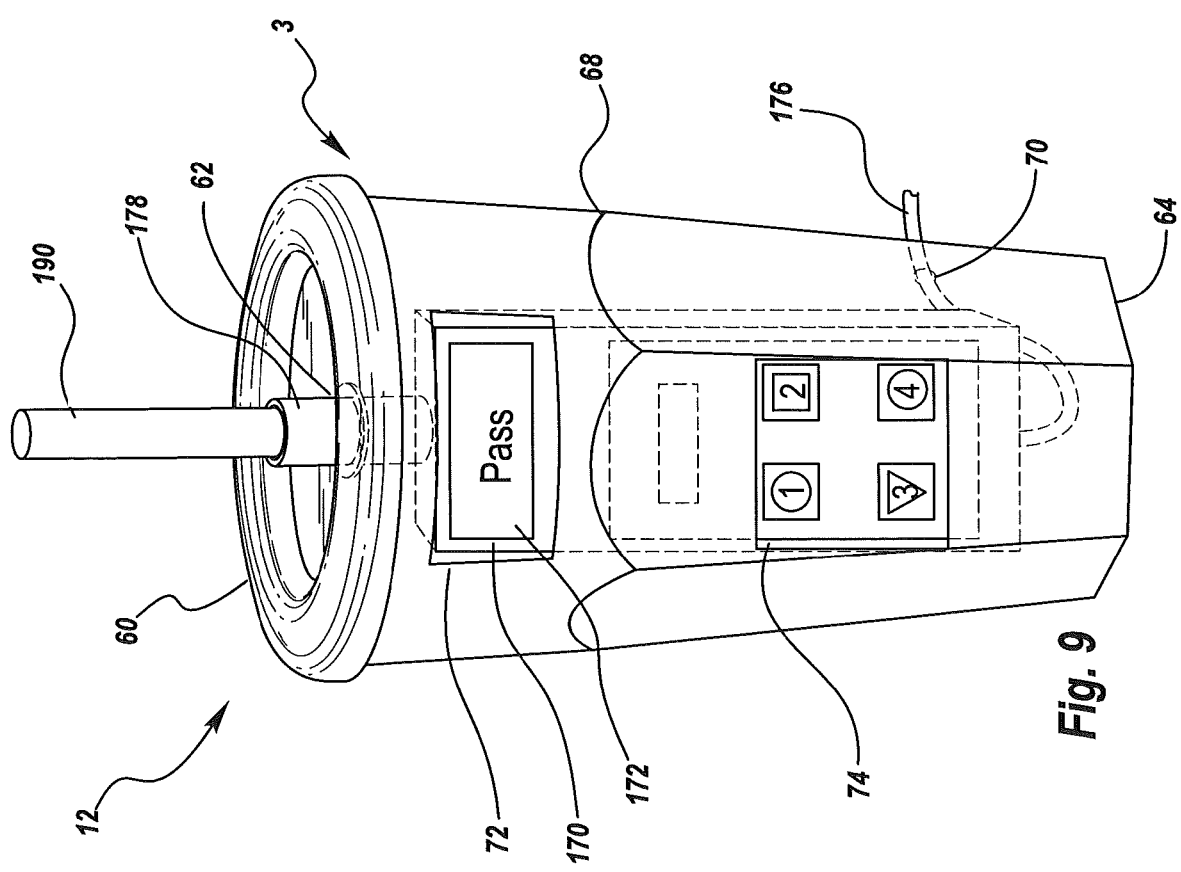

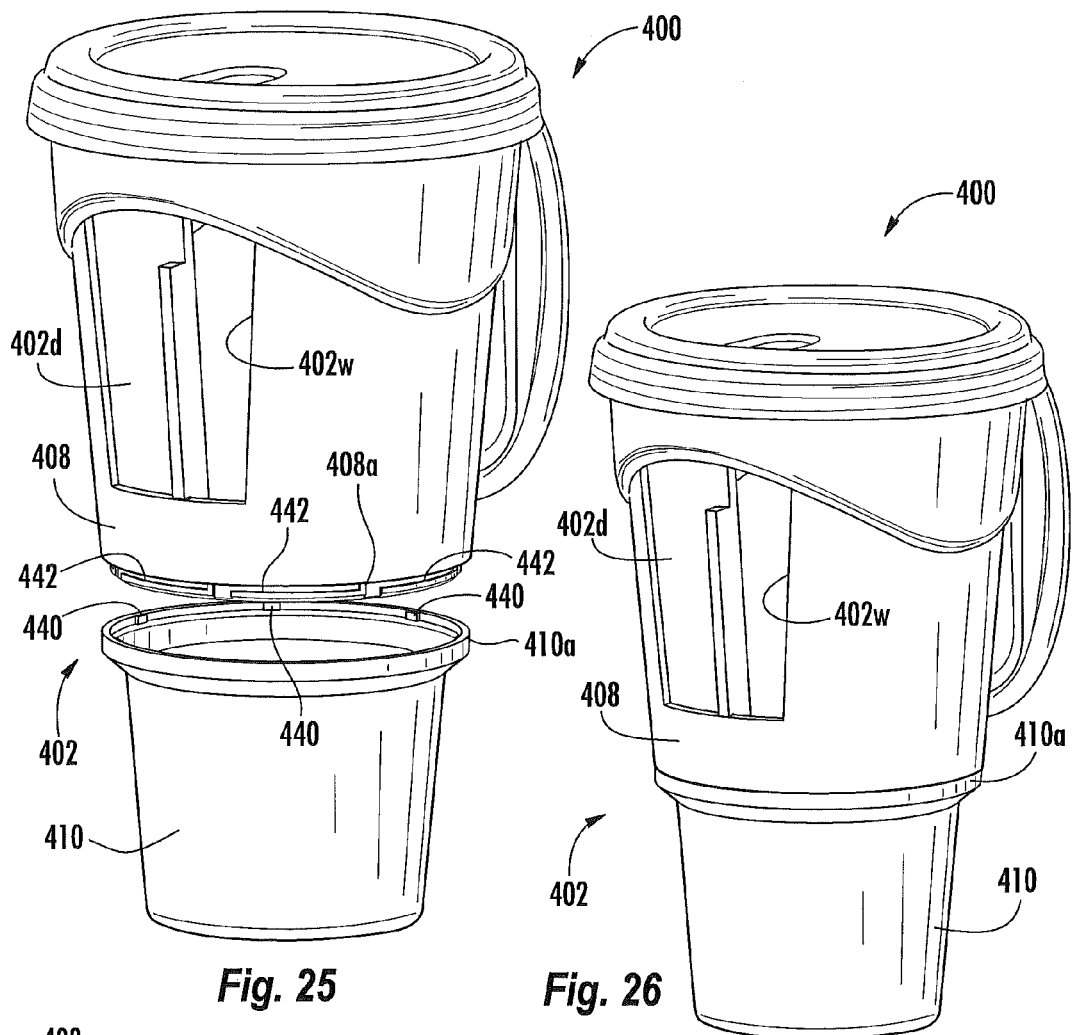
*Fig. 25*  *Fig. 26*
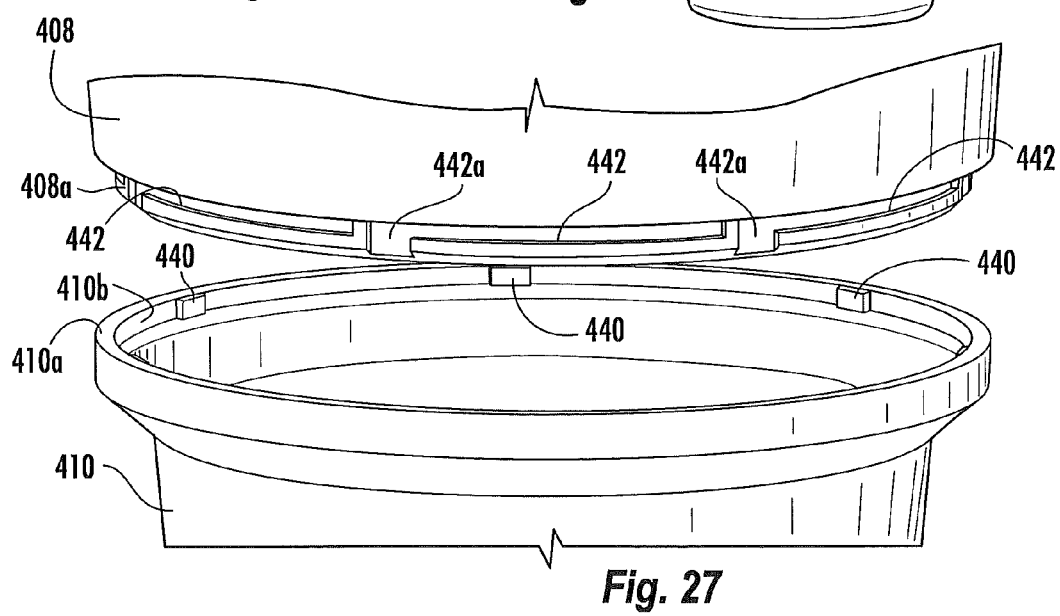
*Fig. 27*

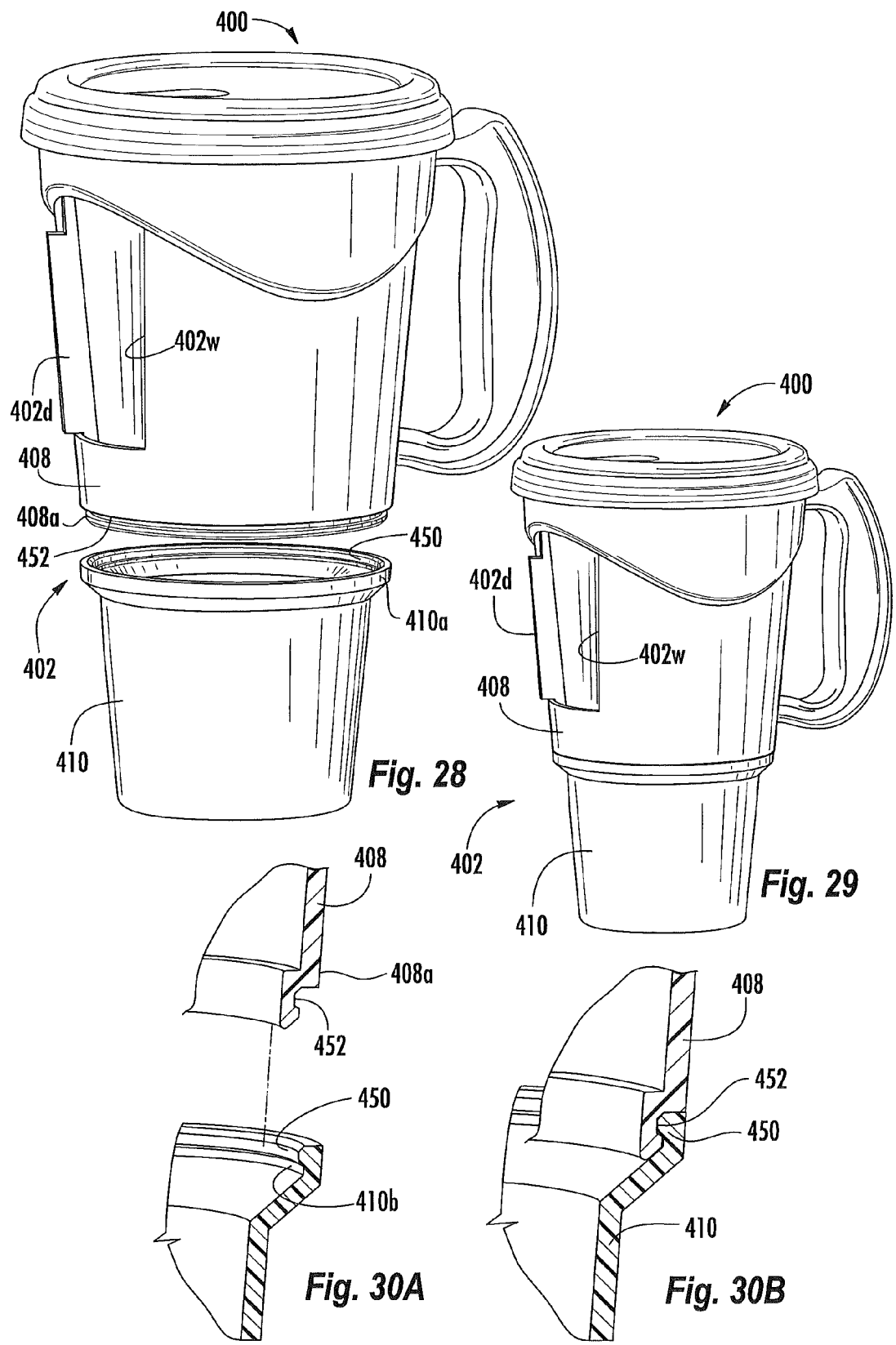

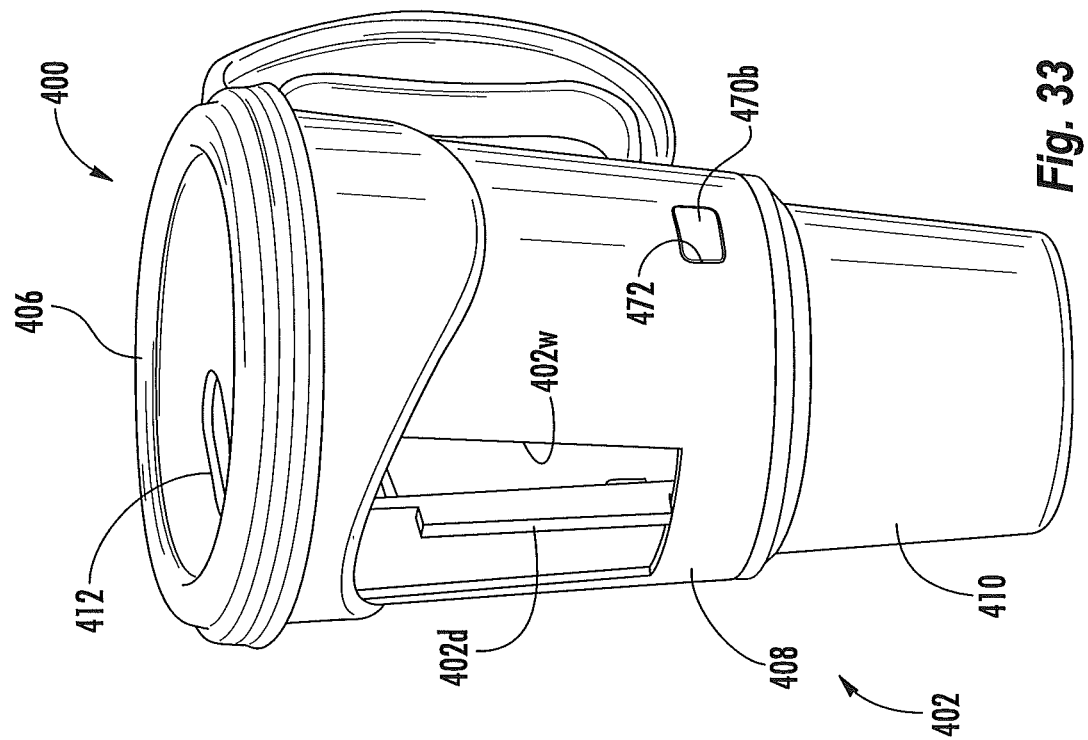
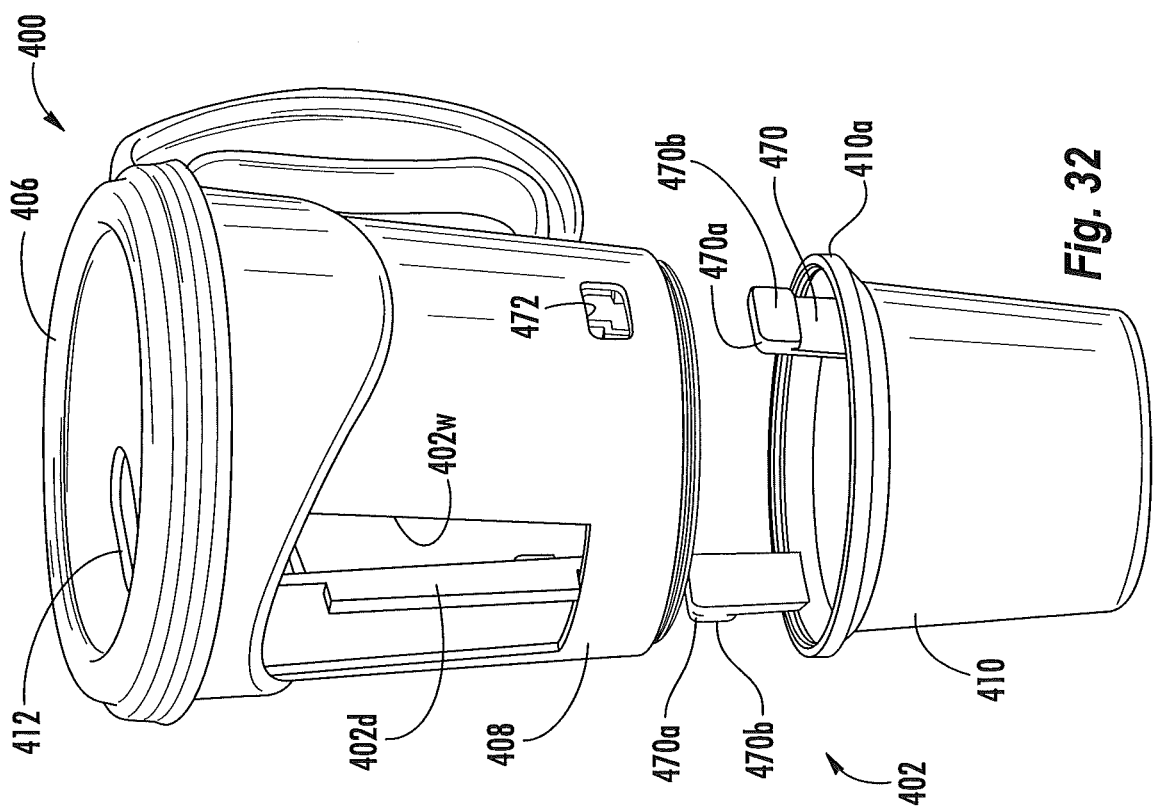

CONCEALMENT APPARATUS FOR IGNITION INTERLOCK DEVICES

RELATED APPLICATIONS

This application is a Continuation in part of the earlier U.S. Design patent application entitled "CONCEALMENT APPARATUS FOR IGNITION INTERLOCK DEVICES", Ser. No. 29/416,713, filed Mar. 26, 2012, now pending. This application is also a Continuation in part of the earlier U.S. Utility patent application entitled "CONCEALMENT APPARATUS FOR IGNITION INTERLOCK DEVICES", Ser. No. 13/249,599, filed Sep. 30, 2011, now pending, which claims the benefit of the provisional application entitled "CONCEALMENT APPARATUS FOR IGNITION INTERLOCK DEVICES", Ser. No. 61/533,352, filed Sep. 12, 2011. The entire disclosures of the foregoing are incorporated herein by reference.

FIELD OF THE INVENTION

The present invention relates generally to sobriety testing devices and, more particularly, to vehicle ignition interlock devices.

BACKGROUND

An ignition interlock device or breath alcohol ignition interlock device ("IID") is a mechanism, like a breathalyzer. Usually, an IID system is installed to a motor vehicle's dashboard. There is no universal clip for installation so often they are attached with adhesive, hook and loop fasteners, or screws, all of which can modify and "damage" the dashboard.

Before the vehicle's motor can be started, the driver first must exhale into the device. If the resultant breath-alcohol concentration analyzed result is greater than the programmed blood alcohol concentration, the device prevents the engine from being started. At random times after the engine has been started, the IID will require another breath sample. The purpose of this is to prevent a friend from breathing into the device, enabling the intoxicated person to get behind the wheel and drive away. If the breath sample isn't provided, or the sample exceeds the ignition interlock's preset blood alcohol level, the device will log the event, warn the driver and then start up an alarm (e.g., lights flashing, horn honking, etc.) until the ignition is turned off, or a clean breath sample has been provided.

In the end, people do not like having IID's installed in their cars because of the installation modifications that are required to their dashboards. They are also embarrassed by them. IIDs draw attention to themselves by, in some cases, making a car's horn honk or flash lights, but certainly when a person has to use them (blow into them, etc.).

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Aspects of this document relate to a concealment apparatus for ignition interlock devices and concealed ignition interlock devices. These aspects may comprise, and implementations may include, one or more or all of the components and steps set forth in the appended CLAIMS, which are hereby incorporated by reference.

In one aspect, a concealment apparatus for ignition interlock devices is disclosed. The concealment apparatus may include a container that has a top, a bottom, and at least one side wall separating the top and the bottom. The at least one sidewall includes a window for viewing a screen of an ignition interlock device.

Particular implementations may include one or more or all of the following.

The container may be opaque or colored. The top of the container may include a through hole for one of a straw member and a mouth piece of the ignition interlock device. The bottom of the container may include a through hole for an electrical cord of the ignition interlock device. The at least one side wall of the container may include a through hole for an electrical cord of the ignition interlock device, at least one opening for at least one speaker of the ignition interlock device, and/or one of at least one opening, at least one push button, and at least one push tab for at least one input member of the ignition interlock device. The window may be one of an open window and a closed window with a clear pane. The container may resemble a beverage container, such as one of a mug, a tumbler, a can, a sports bottle, and a thermos.

In another aspect, an ignition interlock concealment system is disclosed. The ignition interlock concealment system may include a concealment apparatus as described and an ignition interlock device contained therein.

In still another aspect, an ignition interlock device is disclosed. The ignition interlock device may include a housing resembling a beverage container. The housing may include a top, a bottom, and at least one side wall separating the top and the bottom, the at least one sidewall comprising a screen.

Particular implementations may include one or more or all of the following.

The housing may be opaque or colored. The housing may resemble one of a mug, a tumbler, a can, a sports bottle, and a thermos. The at least one side wall may further include a port for an electrical cord, at least one opening for at least one speaker, at least one input member, or any combination thereof.

In some embodiments of the present invention, a concealment apparatus for an ignition interlock device includes a container defining a cavity with an open upper end, and a lid covering the container open upper end. The apparatus may be configured to resemble a beverage container (e.g., a mug, a tumbler, a can, a sports bottle, a thermos, etc.). The container cavity is configured to receive and conceal an ignition interlock device, such as a handheld ignition interlock device. The lid has an elongated through hole for one of a straw member and a mouth piece of an ignition interlock device concealed within the container cavity. The elongated through hole is configured to accommodate mouthpieces of different shapes and configurations from a variety of different types of ignition interlock devices.

In some embodiments of the present invention, the lid includes an actuator that is configured to allow a user to actuate an input member of an ignition interlock device concealed within the container cavity. The actuator may be, for example, a spring-biased push button mechanism that is movable between first and second positions. A spring or other biasing member urges the push button mechanism into the first or non-actuating position. When the push button mechanism is pushed against the biasing force of the spring to the second position, the push button mechanism actuates the input member of the ignition interlock device.

In other embodiments of the present invention, a portion of the lid includes resilient material that can be depressed by a user to actuate an input member of an ignition interlock device within the container cavity. As such, the user can actuate the input member of the ignition interlock device via his/her finger.

In some embodiments of the present invention, the container of the concealment apparatus includes first and second portions that are removably secured together to define the cavity. For example, the first and second portions may be movably connected (e.g., hinged, etc.) to each other so as to be movable between an open configuration and a closed configuration. A latch mechanism is configured to maintain the first and second portions in the closed configuration.

In some embodiments of the present invention, the first and second container portions include respective upper and lower portions. The container lower portion includes an open upper end configured to be removably secured to an open lower end of the container upper portion. The container lower and upper portions may be removably secured together in a variety of ways, without limitation. For example, in some embodiments of the present invention, the upper end of the container lower portion may be configured to threadingly engage the lower end of the container upper portion. In other embodiments of the present invention, the upper end of the container lower portion may be configured to matingly engage/interlock with the lower end of the container upper portion. In yet further embodiments of the present invention, the upper and lower portions may be hinged together.

In some embodiments of the present invention, the container includes a door that is movably secured thereto and that is movable between open and closed positions. A screen or display of an ignition interlock device concealed within the container cavity can be viewed when the door is in the open position.

In some embodiments of the present invention, the container includes an elongated slot that extends from the open upper end. A panel is operably associated with the slot and is movable between an open position providing access to the slot and a closed position preventing access to the slot. When the lid is removed from the container and when the panel is in the open position, the slot is configured to receive a cord of an ignition interlock device placed within the container cavity. The panel cooperates with the slot to form an aperture through which the cord extends from the container when the panel is in the closed position. In some embodiments of the present invention, the panel is slidably associated with the slot. In other embodiments of the present invention, the panel is hinged to the container.

In some embodiments of the present invention, a concealment apparatus for an ignition interlock device includes a container defining a cavity with an open upper end, and a lid covering the open upper end. The apparatus may be configured to resemble a beverage container (e.g., a mug, a tumbler, a can, a sports bottle, a thermos, etc.). The cavity is configured to receive and conceal an ignition interlock device, such as a handheld ignition interlock device. One or more insert members are disposed within the cavity and are configured to engage and support the ignition interlock device within the container cavity. In some embodiments of the present invention, first and second insert members are disposed within the cavity, wherein the first insert member is configured to engage an upper portion of the ignition interlock device, and the second insert member is configured to engage a lower portion of the ignition interlock device. In other embodiments, first and second insert members are configured to engage respective side portions of the ignition interlock device.

In some embodiments of the present invention, one or more insert members may have a formed surface matched to a shape of a portion of the ignition interlock device. In other embodiments, one or more insert members may be configured to engage an ignition interlock device disposed within the cavity at only one or more locations on the ignition interlock device. For example, an insert that makes contact with an ignition interlock device at only one location may be sufficient to prevent movement of the ignition interlock device within the cavity. In some embodiments of the present invention, an insert may make contact with two or more locations of an ignition interlock device.

According to some embodiments of the present invention, an extension apparatus for a mouthpiece of an ignition interlock device includes a tube having an elongate portion terminating at a first open end and a second portion terminating at a second open end. An axial direction defined by the elongate portion is substantially transverse to an axial direction defined by the second portion. The second portion is configured to receive a mouthpiece of an ignition interlock device inserted through the second open end, and the first portion is configured to receive exhaled breath therethrough from a person.

In some embodiments of the present invention, the extension apparatus includes a flange extending circumferentially around the second open end. The flange is configured to engage a flange on a mouthpiece of an ignition interlock device.

In some embodiments if the present invention, the elongate portion of the extension apparatus has a length that is a least one to five times a length of the second portion.

In some embodiments if the present invention, the elongate portion and the second portion are substantially orthogonal to each other such that the extension apparatus is substantially "L"-shaped. However, the extension apparatus can have virtually any shape and configuration, without limitation.

The foregoing and other aspects and implementations of a concealment apparatus, ignition interlock concealment system, and an ignition interlock device may have one or more or all of the following advantages, as well as other benefits discussed elsewhere in this document.

Implementations allow IIDs to be discreet and "camouflaged", while still maintaining the functionality of the IID without anyone knowing what it really is. Implementations simply look as if they were an ordinary, everyday item that you would actually have in your car, like a mug, a cup or tumbler, a sports bottle, a can, a thermos, and any other similar item that could be placed in a cup holder of a car. Furthermore, dashboards do not have to be modified to hold an IID. Implementations can be placed in standard vehicle cupholders.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

FIG. 4 is a top, back perspective view of the concealment apparatus of FIG. 1.

FIG. 5 is a top, back perspective view of another implementation of a concealment apparatus.

FIG. 6A is implementation of an ignition interlock concealment system including the concealment apparatus of FIG. 4 and an ignition interlock device.

FIG. 6B is another implementation of an ignition interlock concealment system including the concealment apparatus of FIG. 5 and an ignition interlock device.

FIG. 7 is a cross-sectional view of the ignition interlock concealment system of FIG. 6A taken along line 7-7.

FIG. 8 is a cross-sectional view of the ignition interlock concealment system of FIG. 6B taken along line 8-8.

FIG. 9 is another implementation of an ignition interlock concealment system including an ignition interlock device.

FIG. 10 is a top view of the ignition interlock concealment system of FIG. 9.

FIG. 11 is a bottom view of the ignition interlock concealment system of FIG. 9.

FIG. 25 is an exploded perspective view of a concealment apparatus for an ignition interlock device, illustrating upper and lower portions of the apparatus, according to some embodiments of the present invention.

FIG. 26 is a perspective view of the concealment apparatus of FIG. 25 with the upper and lower portions removably secured to each other.

FIG. 27 is an enlarged, partial perspective view of the concealment apparatus of FIG. 25 illustrating the interlocking features of the upper and lower portions.

FIG. 28 is an exploded perspective view of a concealment apparatus for an ignition interlock device, illustrating upper and lower portions of the apparatus, according to some embodiments of the present invention.

FIG. 29 is a perspective view of the concealment apparatus of FIG. 28 with the upper and lower portions removably secured to each other.

FIGS. 30A and 30B are enlarged, partial perspective views of the concealment apparatus of FIG. 28 illustrating the interlocking features of the upper and lower portions.

FIG. 32 is an exploded perspective view of a concealment apparatus for an ignition interlock device, illustrating upper and lower portions of the apparatus, according to some embodiments of the present invention.

FIG. 33 is a perspective view of the concealment apparatus of FIG. 32 with the upper and lower portions removably secured to each other.

DETAILED DESCRIPTION

Figure 2:
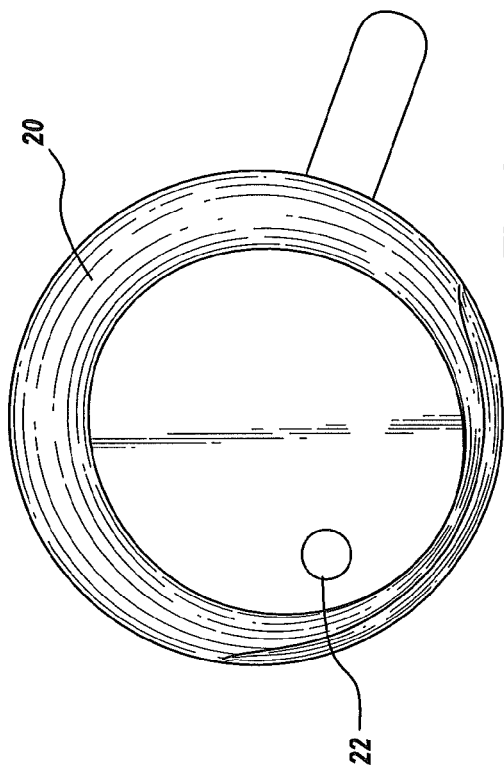
FIG. 2 is a top view of the concealment apparatus of FIG. 1.
Figure 3:
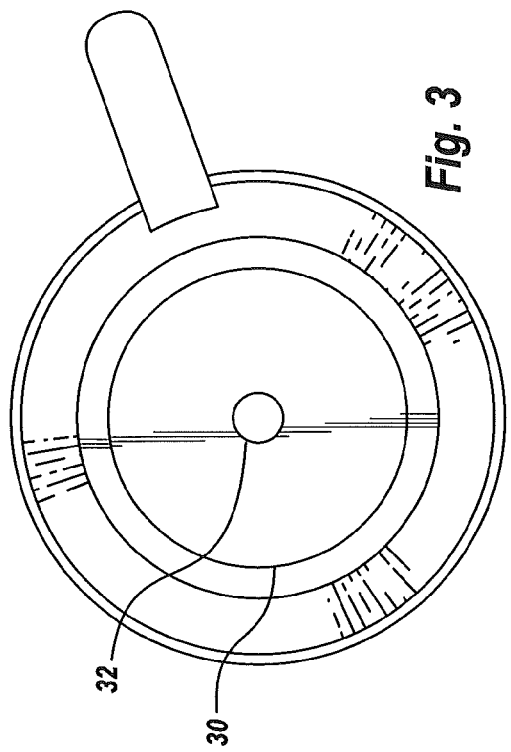
FIG. 3 is a bottom view of the concealment apparatus of FIG. 1.
Figure 1:
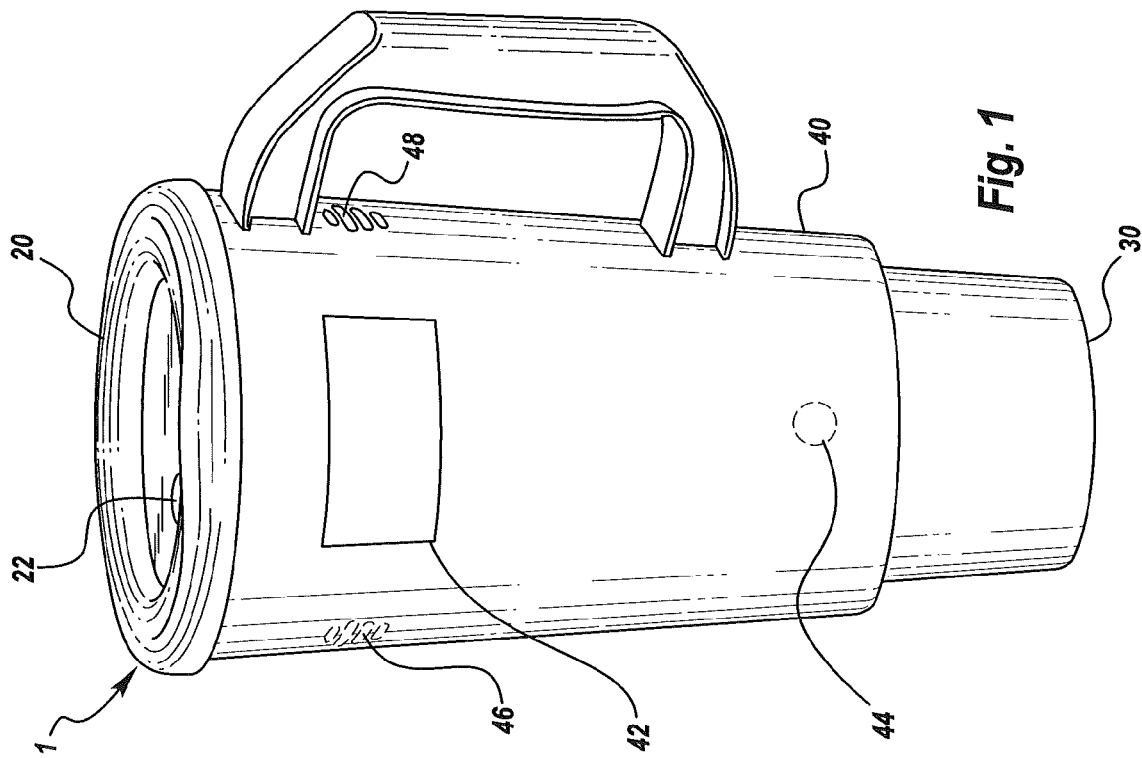
FIG. 1 is a top, front perspective view of an implementation of a concealment apparatus for ignition interlock devices.

The present invention will now be described more fully hereinafter with reference to the accompanying Figures, in which embodiments of the invention are shown. This invention may, however, be embodied in many different forms and should not be construed as limited to the embodiments set forth herein. Like numbers refer to like elements throughout. In the Figures, certain components or features may be exaggerated for clarity, and broken lines may illustrate optional features or elements unless specified otherwise. Features described with respect to one Figure or embodiment can be associated with another embodiment of the Figures although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the Figures. It will be understood that the spatially relative terms are intended to encompass different orientations of the device in use or operation in addition to the orientation depicted in the Figures. For example, if a device in the Figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terms "ignition interlock device" and "IID" are used interchangeably herein, and both refer to a breath alcohol ignition interlock device.

Apparatus

Turning to FIGS. 1-14 generally and for the exemplary purposes of this disclosure, there are a variety of concealment apparatus implementations for disguising ignition interlock devices while still allowing them to function.

A concealment apparatus includes a container that is meant to resemble a beverage container (a cup/tumbler or bottle or can or mug or thermos, etc.) so that it looks like all that is in a person's car is a beverage container for example and not an IID. In general, a concealment apparatus may be opaque or colored to provide complete concealment.

In specific implementations, there is an open or closed window (with a clear pane) on the opaque concealment apparatus so that the screen of the IID can be seen. In specific implementations, the window could be large enough to accommodate an IID with a mouthpiece or breath tube that extends out orthogonally or horizontally from the IID above the screen (as opposed to IIDs that have breath tubes that extend out at an angle or vertically from the top corner or the top of the IID, respectively). In specific implementations, there could also be a window for a camera installed on an IID.

In specific implementations, there are also various other openings or buttons or tabs in the concealment apparatus so that any buttons, triggers, etc. on the ignition interlock device can be accessed and engaged/pushed by a user when the IID is installed inside the concealment apparatus. In specific implementations, there are also openings so that the speaker (s) of the IID can be heard (could be in the form of parallel slots or a plurality of small closely spaced holes for example, or just openings or holes that correspond to the size of the speakers).

In specific implementations, there is a hole at the bottom and/or a lower side of the concealment apparatus for the electrical cable of the IID to extend through. In specific implementations, there is also a hole in the top of the concealment apparatus (e.g., the lid) and/or an upper side of the concealment apparatus for the mouthpiece or breath tube of the IID.

In specific implementations, an integral and molded internal cavity or partial cavity is part of the concealment apparatus that corresponds to the shape or partial shape of the IID, so that the IID can be removably retained inside the concealment apparatus and not move or rotate. In specific implementations, a removable sleeve or sleeve parts (e.g., sleeve halves) are insertable inside the concealment apparatus to form a cavity or partial cavity corresponding to the shape or partial shape of the IID, so that the IID can be removably retained inside the concealment apparatus and not move or rotate. In specific implementations (FIGS. 47 and 48), a U-shaped hanger member is part of the concealment apparatus that is configured to removably receive a corresponding cylindrical member of the IID so that the IID is suspended and held inside the concealment apparatus and will not move or rotate.

System

Turning to FIGS. 6A-14 generally and for the exemplary purposes of this disclosure, there are a variety of ignition interlock concealment system implementations for disguising IIDs while still allowing them to function. An ignition interlock concealment system may generally include a concealment apparatus as described previously and an IID installed/contained therein. All components and features of the IID are accessible and able to be engaged or viewed or heard through corresponding components and features of the concealment apparatus. Again, the concealment apparatus is meant to resemble a beverage container (a cup/tumbler or sports bottle or can or mug or thermos, etc.) so that it looks like all that is in a person's car is a beverage container for example and not an IID. In specific implementations, straws can be attached to the end of the mouth piece or breath tube of the IID.

IID

Figure 18:
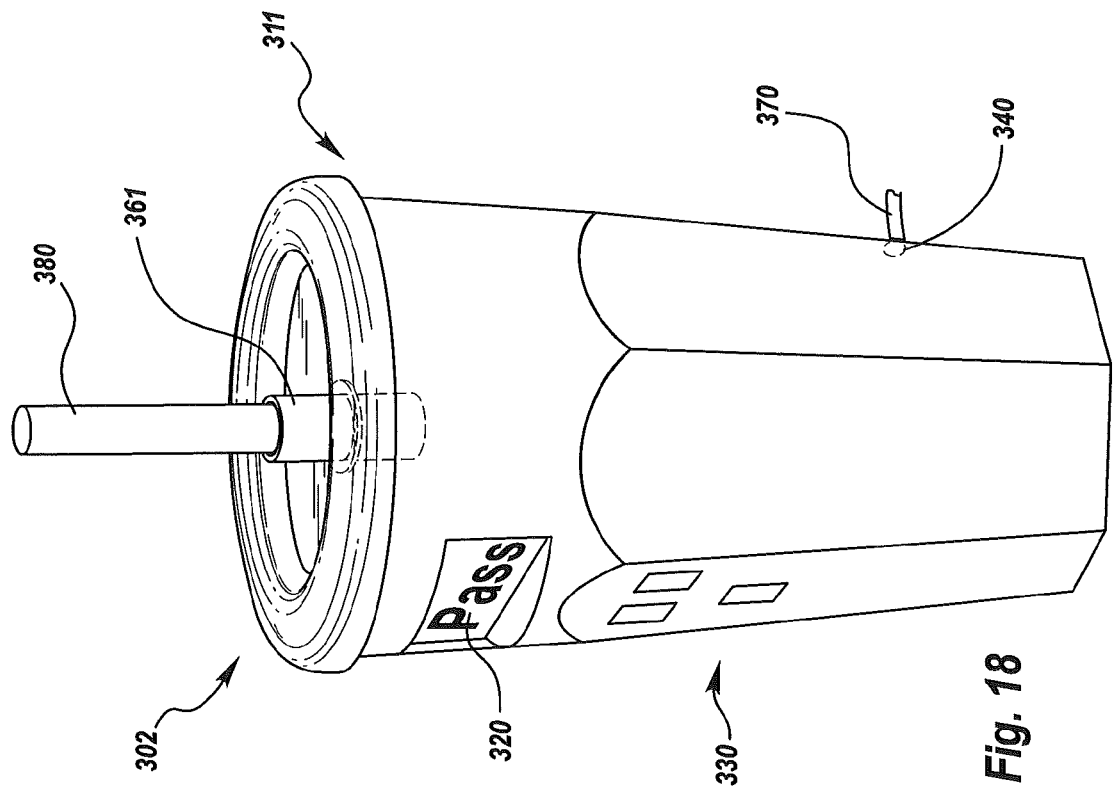
FIG. 18 is another implementation of an ignition interlock device.
Figure 17:
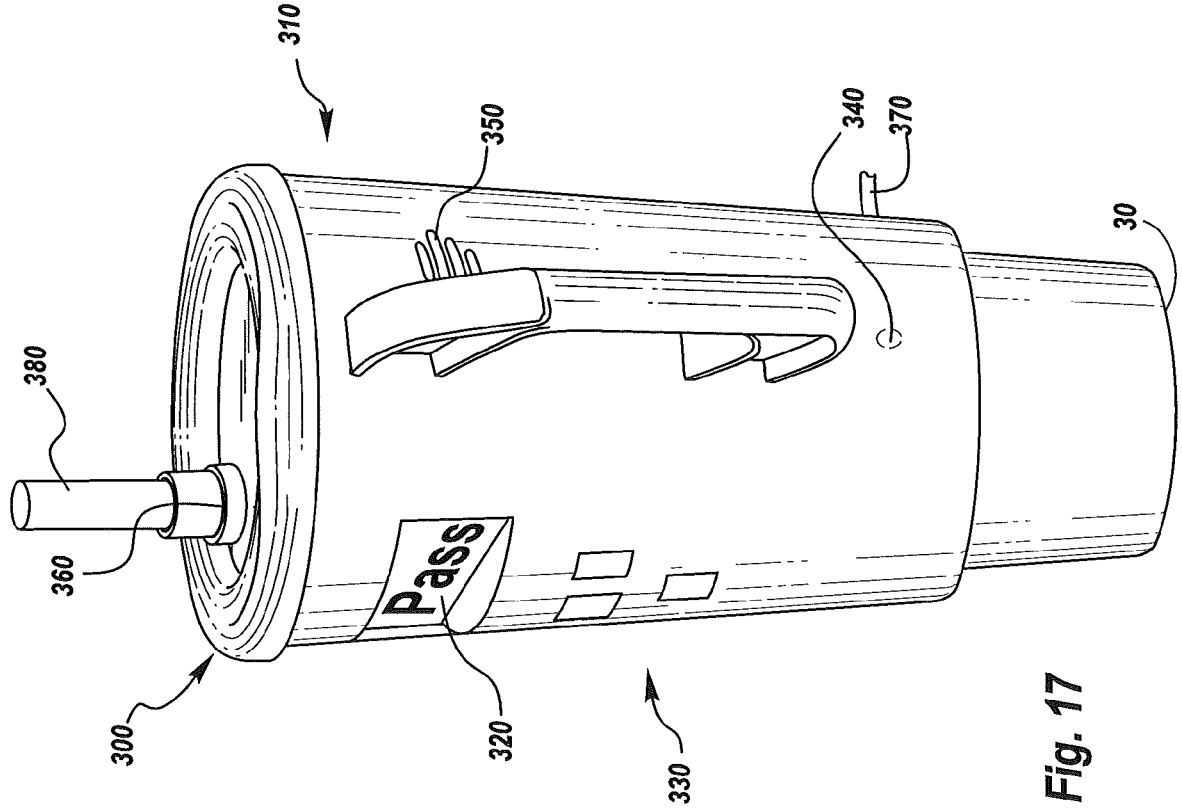
FIG. 17 is even an ignition interlock device.

Turning to FIGS. 17-18 generally and for the exemplary purposes of this disclosure, there are a variety of IID implementations for disguising IIDs while still allowing them to function. An IID may generally include a housing resembling a beverage container. The housing may include a top, a bottom, and at least one side wall separating the top and the bottom, the at least one sidewall comprising a screen. The housing may be opaque or colored. The housing may resemble a mug, a tumbler, a can, a sports bottle, or a thermos. The at least one side wall may further include a port for an electrical cord, at least one opening for at least one speaker, at least one input member, or any combination thereof. Again, the IID is meant to resemble a beverage container (a cup/tumbler or sports bottle or can or mug or thermos, etc.) so that it looks like all that is in a person's car is a beverage container for example and not an IID. In specific implementations, straws can be attached to the end of the mouth piece or breath tube of the IID.

Other and Specific Implementations

As described previously, there are many implementations of a concealment apparatus and an ignition interlock concealment system.

For the exemplary purposes of this disclosure and referring to FIGS. 1-4 and 6A and 7, concealment apparatus 1 and ignition interlock concealment system 10 are depicted. Concealment apparatus 1 includes a container that resembles a mug. The mug container is opaque or colored to conceal an enclosed IID 140.

The mug container has a top that is a removable lid 20 with a through hole 22 for receiving there through a mouthpiece 148 (or straw attached to the mouthpiece 148) of an IID 140 contained inside apparatus 1. A bottom 30 has a through hole 32 for receiving there through an electrical cord 146 of an IID 140 contained inside apparatus 1.

At least one side wall 40 separates the top 20 and the bottom 30. The sidewall 40 includes an open window 42 for viewing a screen 142 of the contained IID 140. A lower part of the sidewall 40 also has a through hole 44 for receiving there through an electrical cord 146 of an IID 140 contained inside apparatus 1. The sidewall 40 also includes at least one opening for at least one speaker of an IID 140 contained inside apparatus 1. In particular, sidewall 40 includes opposing openings 46 and 48 (which are each formed of slots) that correspond to speakers of IID 140 contained inside apparatus 1. Side wall 40 also includes at least one opening, at least one push button, or at least one push tab that corresponds to at least one input member of the IID 140. For example, IID 140 has a depressible trigger 150 on a backside that a user needs to engage during operation of IID 140. Side wall 40 may include a push tab 50 that corresponds to the trigger 150 when IID 140 is contained inside apparatus 1. Push tab 50 can be integral to side wall 40 and be formed of a U-shaped slot through the side wall 40. The back side of tab 50 can have an extension member that extends to the trigger 150 so that when tab 50 is depressed by a user, the extension member depresses the trigger 150.

An internal sidewall 47 is provided that defines a cavity 49. Cavity 49 corresponds to the shape or partial shape of IID 140, so that IID 140 can be removably supported and retained in cavity 49 inside the concealment apparatus 1 and not move or rotate.

For the exemplary purposes of this disclosure and referring to FIGS. 5 and 6B and 8, concealment apparatus 2 and ignition interlock concealment system 11 are depicted. Concealment apparatus 2 and ignition interlock concealment system 11 are similar to concealment apparatus 1 and ignition interlock concealment system 10 as previously described, the principal differences being a larger container, push button 54, window 43, and sleeve 160.

Concealment apparatus 2 includes a container that resembles a mug. The mug container is opaque or colored to conceal an enclosed IID 140.

The mug container has a top that is a removable lid 20 with a through hole 22 for receiving there through a mouthpiece 148 (or straw attached to the mouthpiece 148) of an IID 140 contained inside apparatus 2. A bottom 30 has a through hole 32 for receiving there through an electrical cord 146 of an IID 140 contained inside apparatus 2.

At least one side wall 41 separates the top 20 and the bottom 30. The sidewall 41 includes a closed window 43 for viewing a screen 142 of the contained IID 140. The window 43 has a clear pane 45 formed of an appropriate material. A lower part of the sidewall 41 also has a through hole 44 for receiving there through an electrical cord 146 of an IID 140 contained inside apparatus 2. The sidewall 41 also includes at least one opening for at least one speaker of an IID 140 contained inside apparatus 2. In particular, sidewall 40 includes opposing openings 46 and 48 (which are each formed of slots) that correspond to speakers of IID 140 contained inside apparatus 2. Side wall 41 also includes at least one opening, at least one push button, or at least one push tab that corresponds to at least one input member of the IID 140. For example, IID 140 has a depressible trigger 150 on a backside that a user needs to engage during operation of IID 140. Side wall 41 may include a push button 54 that corresponds to the trigger 150 when IID 140 is contained inside apparatus 2. Push button 54 can be formed of a spring and an extension member that extends to the trigger 150 so that when button 54 is depressed by a user, the extension member depresses the trigger 150.

Removable sleeve 160 is provided that has an top opening and closed bottom/base and at least one side wall, all of which defining a cavity 164. Cavity 164 corresponds to the shape or partial shape of IID 140, so that IID 140 can be removably supported and retained in cavity 164 inside the concealment apparatus 1 and not move or rotate. Sleeve 160 can be a foam sleeve. Sleeve 160 may have a vertical through slot 162 defined through a side wall thereof. Slot 162 accommodates and makes accessible trigger 150, the extension member of push button 54, and electrical cord 146 exiting out through hole 44 in side wall 41.

For the exemplary purposes of this disclosure and referring to FIGS. 9-11, concealment apparatus 3 and ignition interlock concealment system 12 are depicted. Concealment apparatus 3 and ignition interlock concealment system 12 are similar to concealment apparatus) and ignition interlock concealment system 10 as previously described, the principal differences being the type of container.

Concealment apparatus 3 includes a container that resembles a cup or tumbler. The tumbler container is opaque or colored to conceal an enclosed IID 170 which has a different shape and functional features than IID 140.

The tumbler container has a top that is a removable lid 60 with a through hole 62 for receiving there through a mouthpiece 178 of an IID 170 contained inside apparatus 3. A straw 190 is attached to the mouthpiece 178. A bottom 64 has a through hole 66 for receiving there through an electrical cord 176 of an IID 170 contained inside apparatus 3.

At least one side wall 68 separates the top 60 and the bottom 64. The sidewall 68 includes an open window 72 for viewing a screen 172 of the contained IID 170. A lower part of the sidewall 68 also has a through hole 70 for receiving there through an electrical cord 176 of an IID 170 contained inside apparatus 3. Sidewall 68 also includes at least one opening, at least one push button, or at least one push tab that corresponds to at least one input member of the IID 170. For example, IID 170 has a depressible buttons on a front side thereof that a user needs to engage during operation of IID 170. Sidewall 68 may include another open window 74 that corresponds to the buttons of IID 170 when IID 170 is contained inside apparatus 3.

While not shown, an internal sidewall or a removable sleeve that defines a cavity may be provided so that IID 170 can be removably supported and retained in inside the concealment apparatus 3 and not move or rotate.

Figure 12:
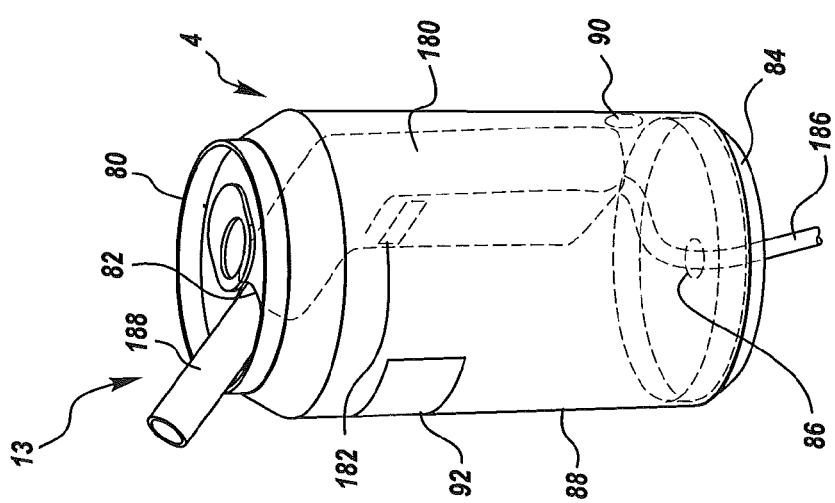
FIG. 12 is still another implementation of an ignition interlock concealment system including an ignition interlock device.

For the exemplary purposes of this disclosure and referring to FIG. 12, concealment apparatus 4 and ignition interlock concealment system 13 are depicted. Concealment apparatus 4 and ignition interlock concealment system 13 are similar to concealment apparatus 1 and ignition interlock concealment system 10 as previously described, the principal differences being the type of container.

Concealment apparatus 4 includes a container that resembles a can. The can container is opaque or colored to conceal an enclosed IID 180 which has a different shape and functional features than IIDs 140 and 170.

The can container has a top 80 with a through hole 82 for receiving therethrough a mouthpiece 188 of an IID 180 contained inside apparatus 4. A bottom 44 is removable (either a screw on bottom or a slip fit bottom for example) and has a through hole 86 for receiving there through an electrical cord 186 of an IID 180 contained inside apparatus 3.

At least one side wall 88 separates the top 80 and the bottom 84. The sidewall 88 includes an open or closed window 92 for viewing a screen 182 of the contained IID 180. A lower part of the sidewall 88 also has a through hole 90 for receiving there through an electrical cord 186 of an IID 180 contained inside apparatus 4. Though not shown, sidewall 88 may also includes at least one opening, at least one push button, or at least one push tab that corresponds to at least one input member of the IID 180, as well as an internal sidewall or a removable sleeve that defines a cavity so that IID 180 can be removably supported and retained in inside the concealment apparatus 4 and not move or rotate.

Figure 13:
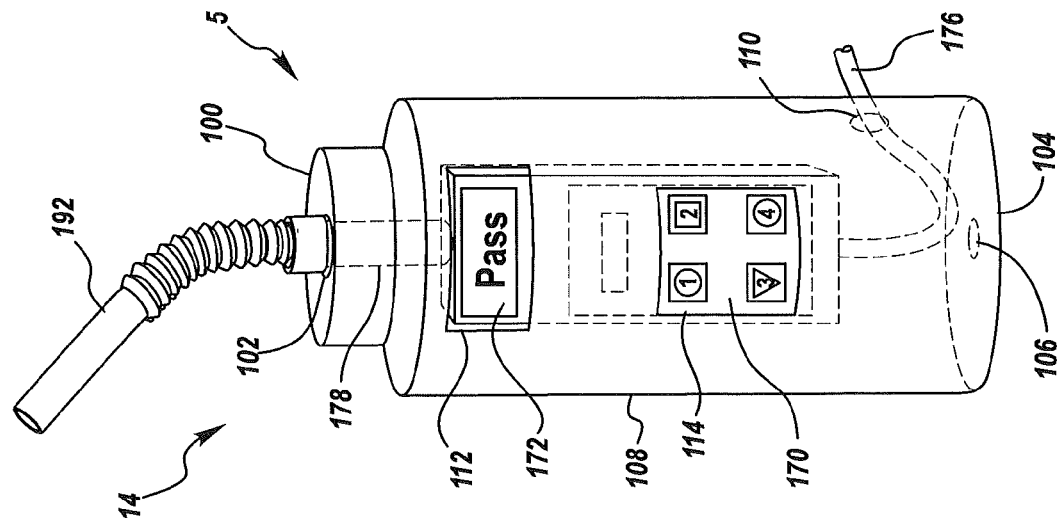
FIG. 13 is yet another implementation of an ignition interlock concealment system including an ignition interlock device.

For the exemplary purposes of this disclosure and referring to FIG. 13, concealment apparatus 5 and ignition interlock concealment system 14 are depicted. Concealment apparatus 5 and ignition interlock concealment system 14 are similar to concealment apparatus 1 and ignition interlock concealment system 10 as previously described, the principal differences being the type of container.

Concealment apparatus 5 includes a container that resembles a sports bottle. The bottle container is opaque or colored to conceal an enclosed IID 170.

The tumbler container has a top that is a removable screw-on lid 100 with a through hole 102 for receiving there through a mouthpiece 178 of an IID 170 contained inside apparatus 5. A straw 192 is attached to the mouthpiece 178. A bottom 104 has a through hole 106 for receiving there through an electrical cord 176 of an IID 170 contained inside apparatus 5.

At least one side wall 108 separates the top 100 and the bottom 104. The sidewall 108 includes an open or closed window 112 for viewing a screen 172 of the contained IID 170. A lower part of the sidewall 108 also has a through hole 110 for receiving there through an electrical cord 176 of an IID 170 contained inside apparatus 5. Side wall 108 also includes at least one opening, at least one push button, or at least one push tab that corresponds to at least one input member of the IID 170. For example, IID 170 has a depressible buttons on a front side thereof that a user needs to engage during operation of IID 170. Side wall 108 may include another open window 114 that corresponds to the buttons of IID 170 when IID 170 is contained inside apparatus 5.

While not shown, an internal sidewall or a removable sleeve that defines a cavity may be provided so that IID 170 can be removably supported and retained in inside the concealment apparatus 5 and not move or rotate.

Figure 14:
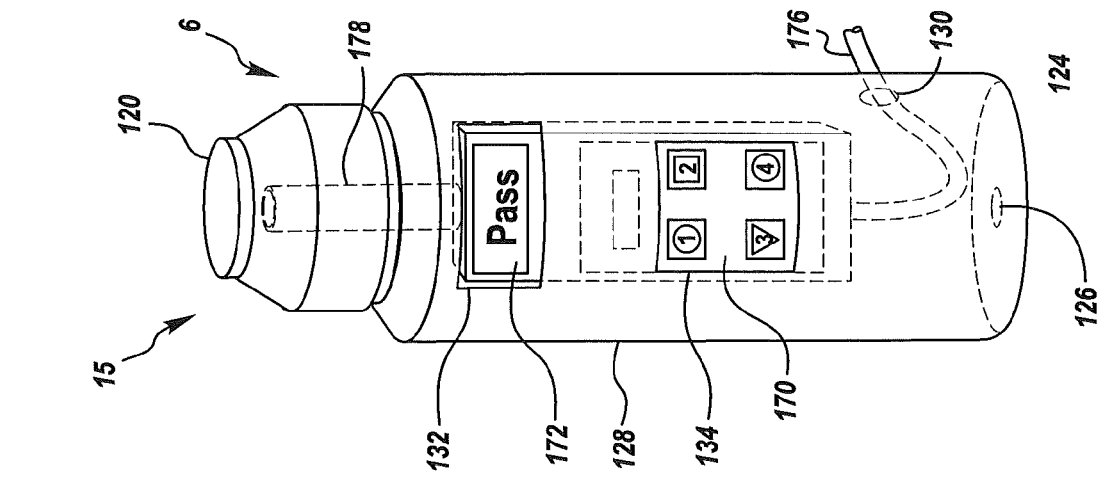
FIG. 14 is even another implementation of an ignition interlock concealment system including an ignition interlock device.

For the exemplary purposes of this disclosure and referring to FIG. 14, concealment apparatus 6 and ignition interlock concealment system 15 are depicted. Concealment apparatus 6 and ignition interlock concealment system 15 are similar to concealment apparatus 1 and ignition interlock concealment system 10 as previously described, the principal differences being the type of container.

Concealment apparatus 6 includes a container that resembles a thermos. The thermos container is opaque or colored to conceal an enclosed IID 170.

The thermos container has a top that is a removable screw-on lid 120. Mouthpiece 178 of an IID 170 contained inside lid 120 and is accessible when lid 120 is unscrewed. A bottom 124 has a through hole 126 for receiving there through an electrical cord 176 of an IID 170 contained inside apparatus 6.

At least one side wall 128 separates the top 120 and the bottom 126. The sidewall 128 includes an open window 132 for viewing a screen 172 of the contained IID 170. A lower part of the sidewall 128 also has a through hole 130 for receiving therethrough an electrical cord 176 of an IID 170 contained inside apparatus 6. Side wall 128 also includes at least one opening, at least one push button, or at least one push tab that corresponds to at least one input member of the IID 170. For example, IID 170 has a depressible buttons on a front side thereof that a user needs to engage during operation of IID 170. Side wall 128 may include another open window 134 that corresponds to the buttons of IID 170 when IID 170 is contained inside apparatus 6.

While not shown, an internal sidewall or a removable sleeve that defines a cavity may be provided so that IID 170 can be removably supported and retained in inside the concealment apparatus 6 and not move or rotate.

For the exemplary purposes of this disclosure, instead of being two separate devices (a concealment apparatus and an IID) that form a concealment system as described in previous implementations, they could be one in the same device. That is, the actual housing of the IID itself could be formed into the shape of a mug, tumbler, thermos, bottle, can, etc.

For the exemplary purposes of this disclosure and referring to FIGS. 17 and 18, IIDs 300 and 302 are depicted. IIDs 300 and 302 are fully functioning IIDs with all the necessary electrical, computer, mechanical, etc. components required to analyze breath-alcohol concentration, etc. IIDs 300 and 302 are similar, except IID 300 includes a housing 310 resembling a mug, while IID 302 includes a housing 311 resembling a tumbler/cup. Each housing 310 and 311 includes a top, a bottom, and at least one side wall separating the top and the bottom, the at least one sidewall including a screen 320. The housings 310 and 311 may be opaque or colored. The at least one side wall of the housings 310 may further include a port 340 for an electrical cord 370, at least one opening 350 for at least one speaker, at least one input member 330, or any combination thereof. Also included are mouthpieces 360 and 361, and if desired to further carry out the effect of resembling a beverage container, straw members 380 may be included.

Specifications, Materials, Manufacture, Assembly

It will be understood that implementations are not limited to the specific components disclosed herein, as virtually any components consistent with the intended operation of a concealment apparatus implementation may be utilized. Accordingly, for example, although particular components and so forth, are disclosed, such components may comprise any shape, size, style, type, model, version, class, grade, measurement, concentration, material, weight, quantity, and/or the like consistent with the intended operation of a concealment apparatus implementation. Implementations are not limited to uses of any specific components, provided that the components selected are consistent with the intended operation of a concealment apparatus implementation.

Accordingly, the components defining any concealment apparatus implementation may be formed of any of many different types of materials or combinations thereof that can readily be formed into shaped objects provided that the components selected are consistent with the intended operation of a concealment apparatus implementation. For example, the components may be formed of: rubbers (synthetic and/or natural) and/or other like materials; glasses (such as fiberglass), carbonfiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; foams formed of polymers and/or other like materials; composites and/or other like materials; metals, such as zinc, magnesium, titanium, copper, iron, steel, carbon steel, alloy steel, tool steel, stainless steel, spring steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

For the exemplary purposes of this disclosure, concealment apparatus implementations may be made of any material such as polymers, metals, composites, ceramics, and/or the like. The material(s) may be picked so as to make the concealment apparatus have any desirable attribute such as strength, light weight, opaqueness, durability, aesthetic appeal, the ability to easily grip and/or hold the concealment apparatus, and so forth.

Various concealment apparatus implementations may be manufactured using conventional procedures as added to and improved upon through the procedures described here. Some components defining concealment apparatus implementations may be manufactured simultaneously and integrally joined with one another, while other components may be purchased pre-manufactured or manufactured separately and then assembled with the integral components.

Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener, wiring, any combination thereof, and/or the like for example, depending on, among other considerations, the particular material forming the components.

It will be understood that the assembly of concealment apparatus implementations are not limited to the specific order of steps as disclosed in this document. Any steps or sequence of steps of the assembly of concealment apparatus implementations indicated herein are given as examples of possible steps or sequence of steps and not as limitations, since various assembly processes and sequences of steps may be used to assemble concealment apparatus implementations.

Use

Implementations of concealment apparatus are particularly useful in IID applications as previously explained. Implementations of concealment apparatus are particularly useful in IID applications as previously explained. Implementations allow IIDs to be discreet and "camouflaged", while still maintaining the functionality of the IID without anyone knowing what it really is. Implementations simply look as if they were an ordinary, everyday item that you would actually have in your car, like a mug, a cup or tumbler, a sports bottle, a can, a thermos, and any other similar item that could be placed in a cup holder of a car. However, implementations are not limited to uses relating to specific IIDs. Rather, any description relating to a particular IID is for the exemplary purposes of this disclosure, and implementations may also be used with a variety of other IIDs with similar results.

Figure 15:
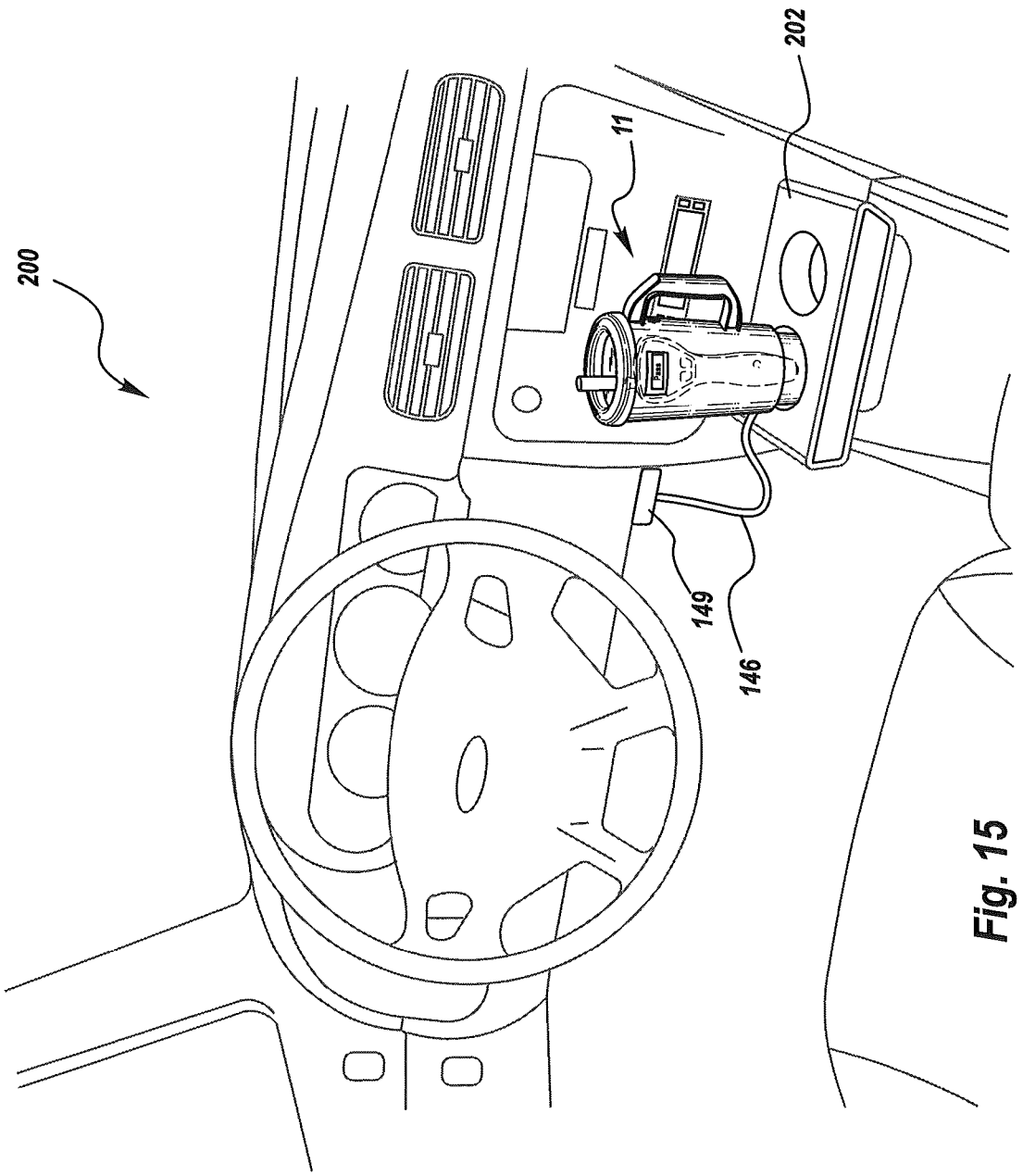
FIGS. 15 and 16 are perspective views of the ignition interlock concealment system of FIG. 6B in use in a vehicle with a driver.
Figure 16:
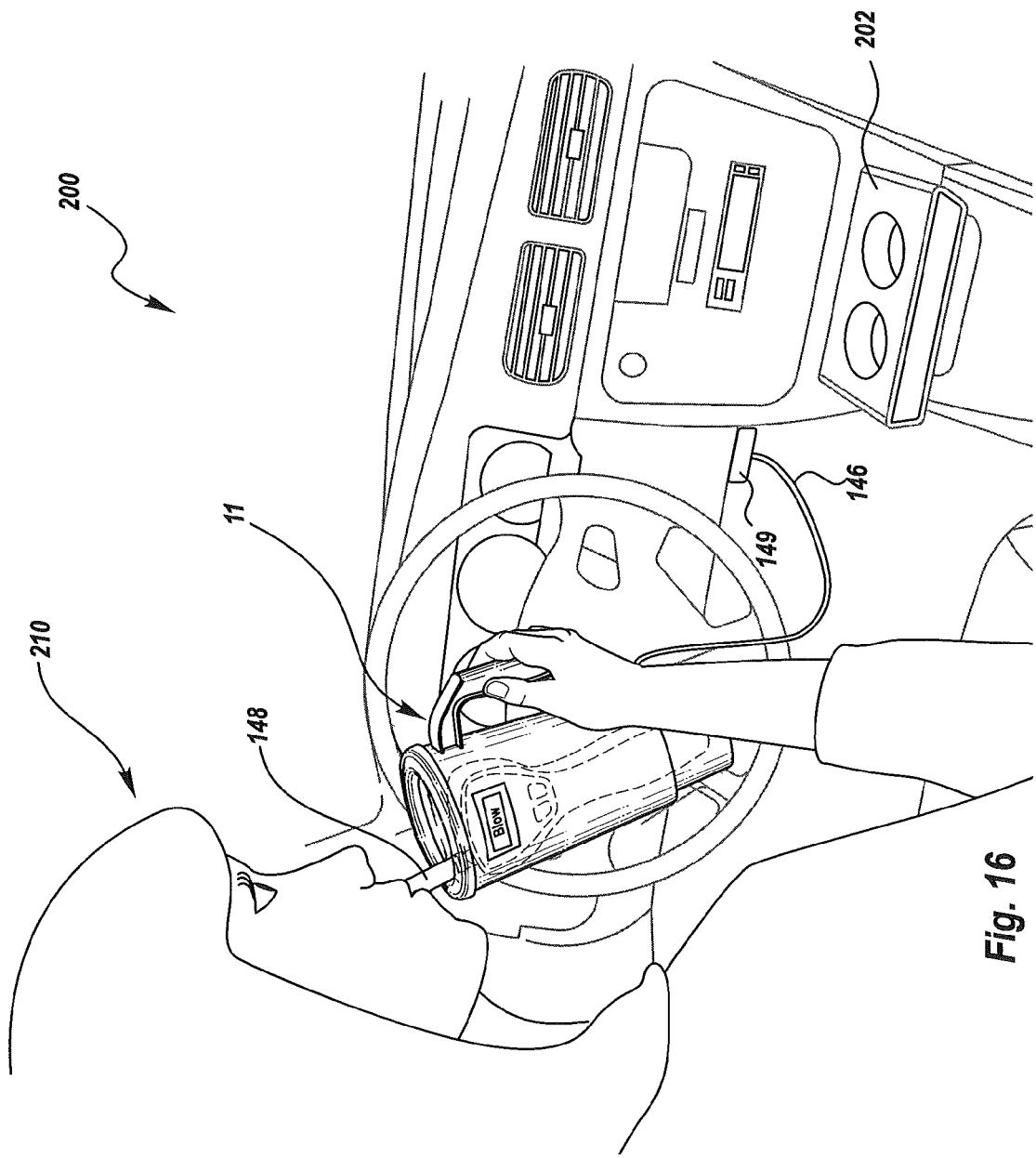

For the exemplary purposes of this disclosure and describing the use of concealment apparatus implementations further, reference is made to FIGS. 15-16. In operation, ignition interlock concealment system 11 can be placed in cup holder 202 of vehicle 200. Electrical cord 146 of IID 140 can come out the side wall 40 of apparatus 1 and extend to module 149 mounted to the underside of the dashboard for example.

Before the vehicle 200 motor can be started, the driver 210 first must exhale into IID 140 contained in apparatus 1 forming system 11. If the resultant breath-alcohol concentration analyzed result is greater than the programmed blood alcohol concentration, IID 140 prevents the engine from being started.

At random times after the engine has been started, the IID 140 will require another breath sample as depicted in FIG. 16. The purpose of this is to prevent a friend from breathing into the device, enabling the intoxicated person to get behind the wheel and drive away. If the breath sample isn't provided, or the sample exceeds the IID 140 preset blood alcohol level, IID 140 will log the event, warn the driver 210 and then start up an alarm (e.g., lights flashing, horn honking, etc.) until the ignition is turned off, or a clean breath sample has been provided.

Notwithstanding, IID 140 remains discreet and "camouflaged" in apparatus 1, while still being functional. System 11 simply looks like a mug—an ordinary, everyday item that you would actually have in your car—that could be placed in a standard cup holder 202 of a vehicle 200 without having to modify the dashboard to hold IID 140. When driver 210 blows into mouthpiece 148, it simply appears as if driver 210 is drinking from a mug.

Figure 19:
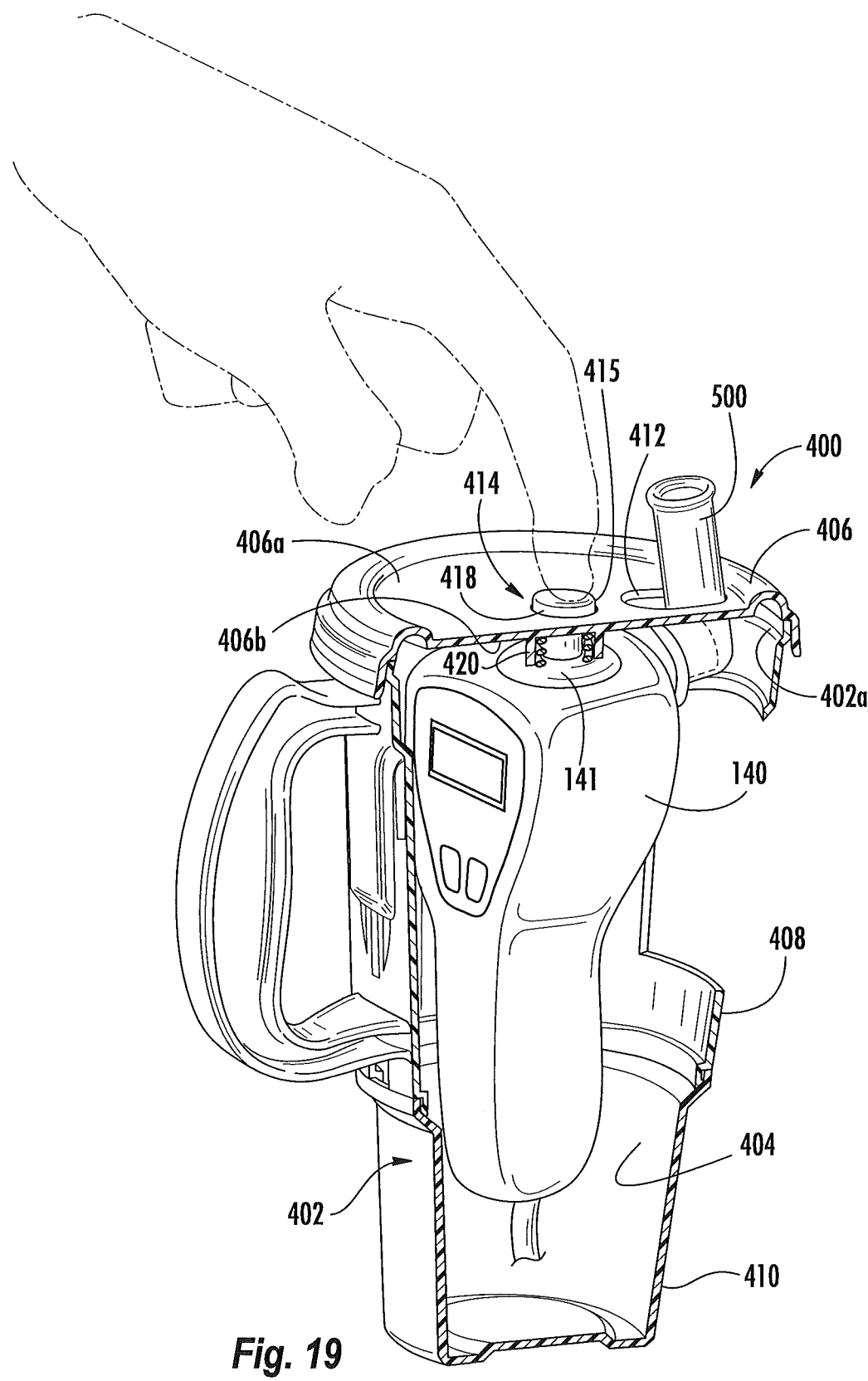
FIG. 19 is a fragmentary perspective view of a concealment apparatus for an ignition interlock device, according to some embodiments of the present invention.

Referring now to FIG. 19, a concealment apparatus 400 for an ignition interlock device 140, according to other embodiments of the present invention, is illustrated. The illustrated concealment apparatus 400 includes a container 402 that defines a cavity 404 with an open upper end 402a. The cavity 404 is configured to receive and conceal an ignition interlock device, such as a handheld ignition interlock device 140. A lid 406 is configured to cover the container open upper end 402a, and has opposite upper and lower sides 406a, 406b. The lid 406 may be permanently secured to the container upper end 402a or may be removably secured to the container upper end 402a (e.g., the lid 406 may snap on the container upper end 402a). In the illustrated embodiment, the container 402 includes upper and lower portions 408, 410 that are removably secured together. When separated, the upper and lower portions 408, 410 facilitate the insertion of an ignition interlock device 140 within the cavity 404. The illustrated apparatus 400 is configured to resemble a beverage container, such as a mug. However, various other beverage container shapes (e.g., a tumbler, a can, a sports bottle, a thermos, etc.) may be utilized. Moreover, embodiments of the present invention are not limited to the shape of a beverage container. Other shapes and configurations are possible.

The lid 406 has an aperture or through hole 412 formed therein. The aperture 412 is configured to receive the mouth piece, or mouth piece extension 500 of an ignition interlock device 140 concealed within the container cavity 404. The through hole 412 has an oblong or elongated configuration to accommodate the mouth pieces of various types of ignition interlock devices. In some embodiments of the present invention, the elongated through hole 412 has a length of between about one quarter inch and about two inches (0.25 in.-2.0 in.) and has a width of between about one quarter inch and about two inches (0.25 in.-2.0 in.). However, the through hole 412 can have various shapes and sizes and is not limited to any particular length, width, or shape. In some embodiments of the present invention, once a mouthpiece (or mouthpiece extension apparatus 500) is extended through the through hole 412, an insert may be placed within the elongated through hole 412 to cover the remaining open portion of the through hole 412.

Figure 21:
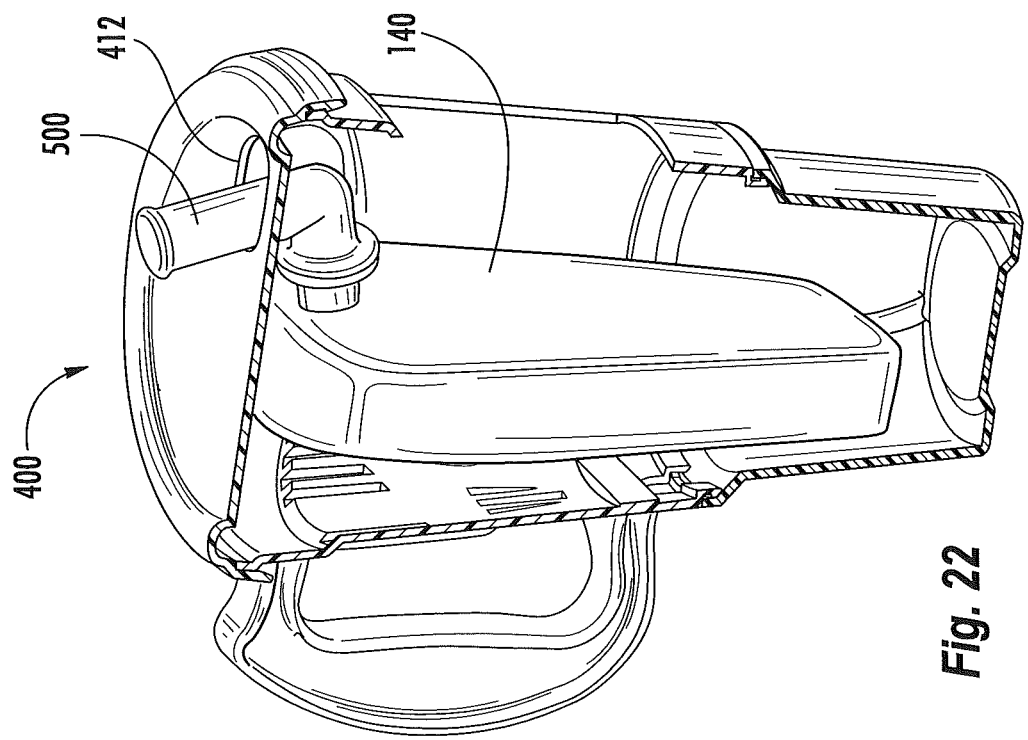
FIGS. 21 and 22 are fragmentary perspective views of a concealment apparatus for an ignition interlock device, according to some embodiments of the present invention.
Figure 22:
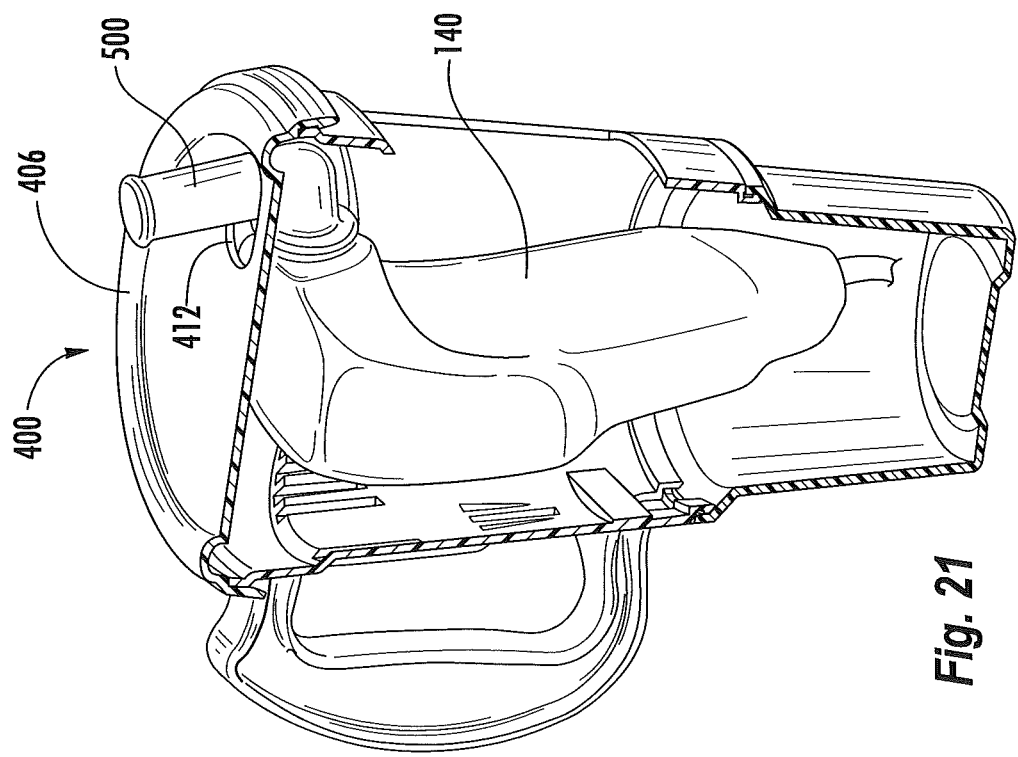
Figure 23:
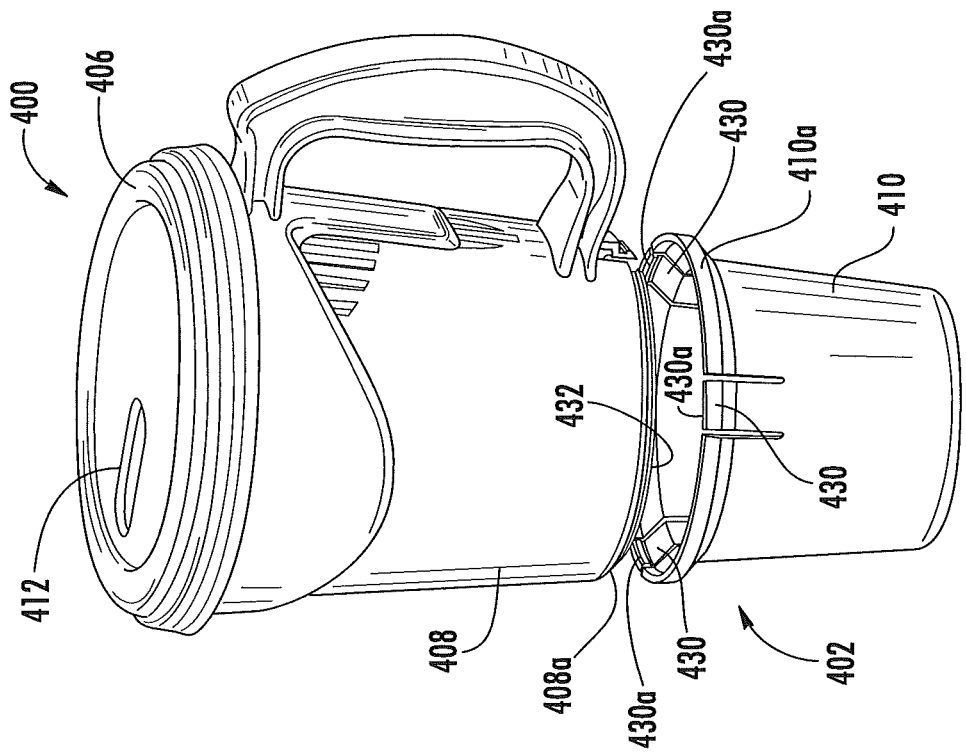
FIG. 23 is an exploded perspective view of a concealment apparatus for an ignition interlock device, illustrating upper and lower portions of the apparatus, according to some embodiments of the present invention.

Not all types of ignition interlock devices have a mouth piece with the same size or shape. Moreover, the mouth pieces of different types of ignition interlock devices can extend outwardly from the devices at different angles. The elongated configuration of the through hole 412 permits mouth pieces oriented at different angles and having different shapes and sizes to extend therethrough. As such, the apparatus 400 can accommodate a wide variety of ignition interlock devices from various manufacturers. FIGS. 21 and 23 illustrate different types of ignition interlock devices 140 with different mouthpiece orientations. The elongated through hole 412 in the lid 406 accommodates the different orientations of the mouthpieces of the two illustrated ignition interlock devices 140.

In the illustrated embodiment of FIG. 19, the lid 406 includes an actuator 414 that is configured to allow a user to actuate an input member 141 of an ignition interlock device 140 concealed within the container cavity 404. The illustrated actuator 414 is a spring-biased push button mechanism wherein the push button is movable between first and second positions. The lid 406 includes an aperture 415 formed therethrough and an actuator housing 420 that extends downwardly from the lid lower side 406b. The actuator housing 420 contains a biasing member or spring 416 and a push button 418. The spring 416 is configured to urge the push button 418 into the first or non-actuating position. When the push button 418 is pushed against the biasing force of the spring 416 to the second position, the push button 418 makes contact with and actuates the input member 141 of the ignition interlock device 140.

Figure 20:
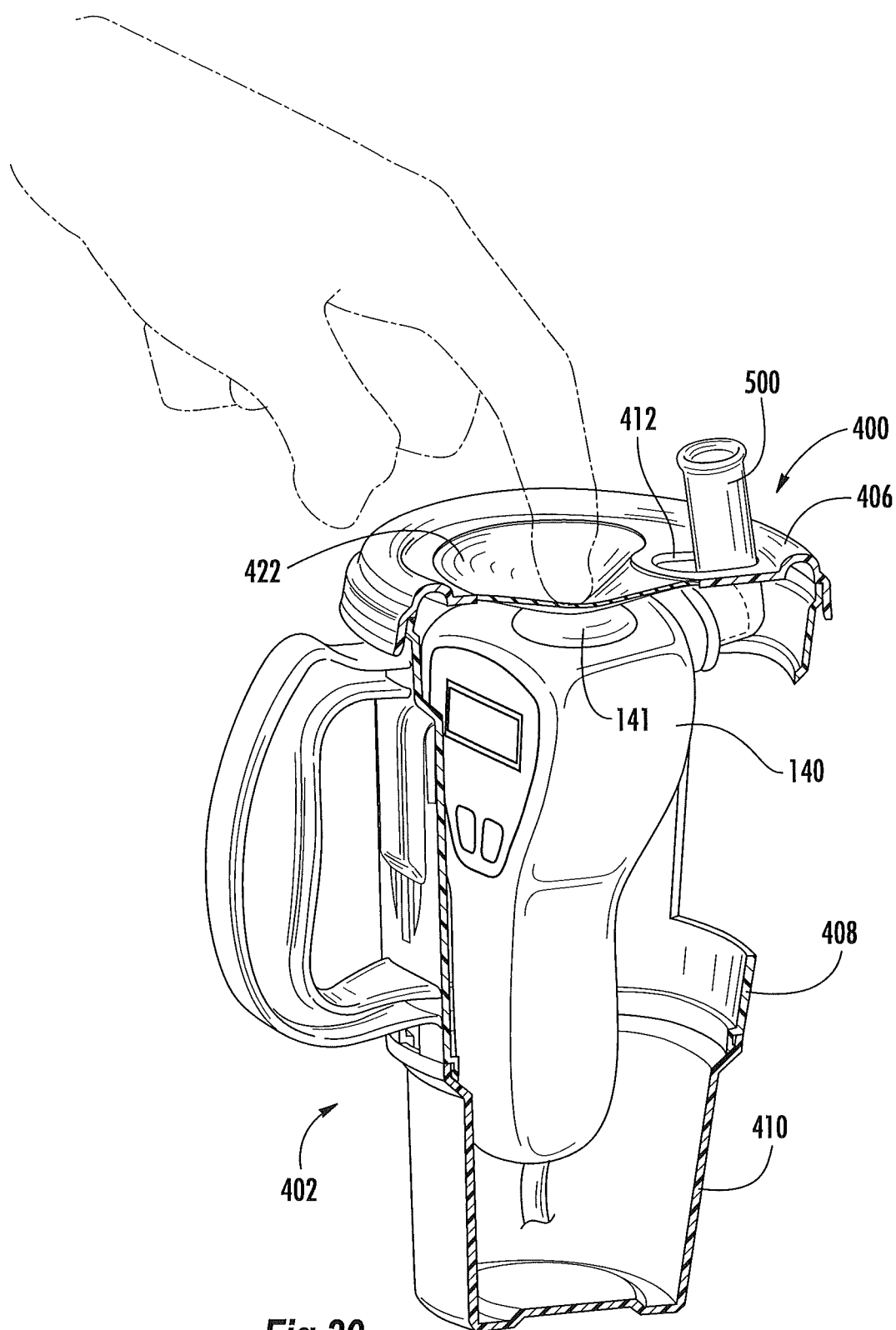
FIG. 20 is a fragmentary perspective view of a concealment apparatus for an ignition interlock device, according to some embodiments of the present invention.

In an alternative embodiment of the present invention illustrated in FIG. 20, a portion of the lid 406 of a concealment apparatus 400 includes resilient material 422 that can be depressed by a user to actuate an input member 141 of an ignition interlock device 140 concealed within the container cavity 404. The resilient material returns to its undeformed shape after a user has actuated an input member 141 of an ignition interlock device 140. Various types of resilient material may be utilized, without limitation. Moreover, the resilient material 422 may have various shapes and configurations within the lid 406.

The container 402 of a concealment apparatus 400, according to some embodiments of the present invention, includes upper and lower portions 408, 410 that are removably secured together to define the cavity 404. The container upper and lower portions 408, 410 may be removably secured together in a variety of ways, without limitation. FIGS. 23-33 and 41-43 illustrate various embodiments of the present invention wherein the container lower portion 410 includes an open upper end 410a configured to be removably secured to an open lower end 408a of the container upper portion 408.

Figure 24:
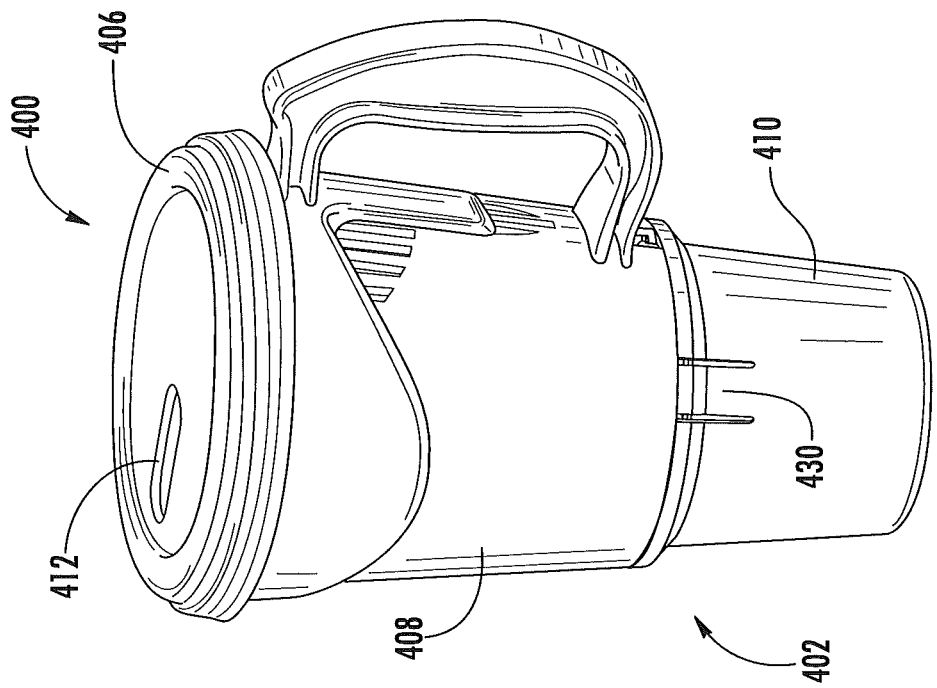
FIG. 24 is a perspective view of the concealment apparatus of FIG. 23 with the upper and lower portions removably secured to each other.

For example, in FIG. 23, the upper end 410a of the container lower portion 410 includes a plurality of flexible tabs 430, each having an upper portion 430a configured to engage with a rib 432 extending circumferentially around the lower end 408a of the container upper portion 408. To assemble the container 402, the upper and lower container portions 408, 410 are pushed together. The rib 432 engages the upper portion 430a of each flexible tab 430 causing the flexible tabs 430 to bias slightly outwardly. The flexible tabs 430 then snap back and the upper portion 430a of each flexible tab 430 grips the rib 432 when the container upper and lower portions 408, 410 are fully seated (FIG. 24). The upper portions 430a of the flexible tabs 430 form a press fit with the rib of the container upper portion lower end 408a. To remove the upper and lower container portions 408, 410 from each other, a user grips the upper and lower container portions 408, 410 and pulls them apart.

Referring to FIGS. 25-26, a concealment apparatus 400 according to some embodiments of the present invention is illustrated. The upper end 410a of the container lower portion 410 includes an inner surface 410b with a plurality of locking elements 440 extending outwardly therefrom in circumferentially spaced apart relationship. The lower end 408a of the container upper portion 408 includes a corresponding plurality of locking elements 442 in circumferentially spaced apart relationship. Each locking element 440 is configured to cooperate with and slidably engage a respective locking element 442. To join the upper and lower container portions 408, 410, a user aligns the locking elements 440 with the open portions 442a of the respective locking elements 442. The user then pushes the upper and lower portions 408, 410 together and twists them with respect to each other so that the locking elements 440 slidably engage the respective locking elements 442. FIG. 26 illustrates the container upper and lower portions 408, 410 secured together. To remove the upper and lower container portions 408, 410 from each other, a user grips the upper and lower container portions 408, 410, twists the upper and lower container portions 408, 410 with respect to each other, and pulls them apart.

Referring to FIGS. 28, 29 and 30A-30B, a concealment apparatus 400 according to some embodiments of the present invention is illustrated. The upper end 410a of the container lower portion 410 includes an inner surface 410b with a rib 450 extending outwardly therefrom and circumferentially therearound, as illustrated. The lower end 408a of the container upper portion 408 includes a groove 452 extending circumferentially therearound, as illustrated. The upper portion groove 452 is configured to receive the lower portion rib 450 and retain the container upper and lower portions 408, 410 together. To assemble the container 402, a user pushes the upper and lower portions 408, 410 together such that the container upper portion groove 452 forms a press fit with the rib 450 of the container lower portion 410. To remove the upper and lower container portions 408, 410 from each other, a user grips the upper and lower container portions 408, 410 and pulls them apart.

Figure 31:
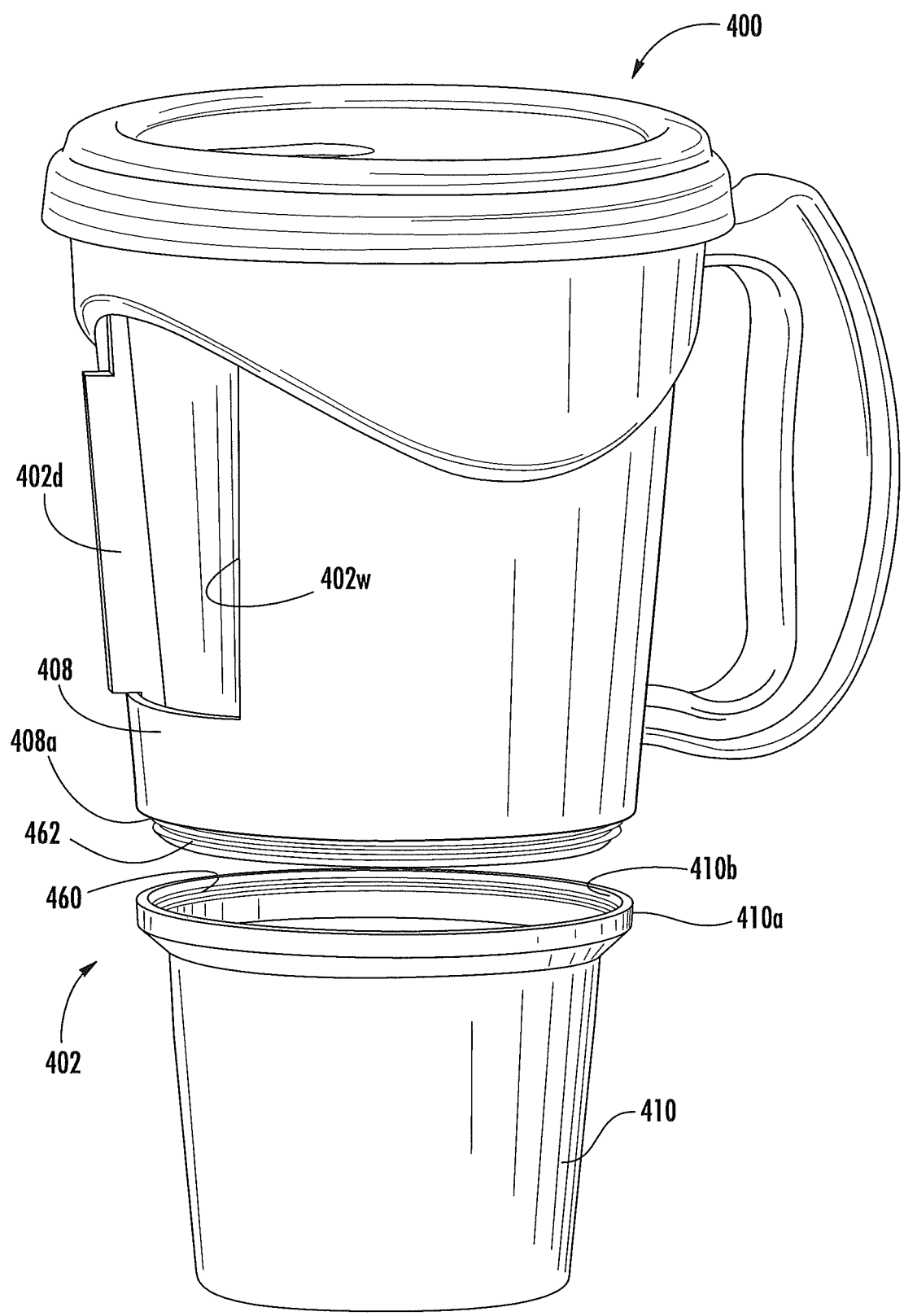
FIG. 31 is an exploded perspective view of a concealment apparatus for an ignition interlock device, illustrating upper and lower portions of the apparatus, according to some embodiments of the present invention.

Referring to FIG. 31, a concealment apparatus 400 according to some embodiments of the present invention is illustrated. The upper end 410a of the container lower portion 410 includes an inner surface 410b with threads 460, as illustrated. The lower end 408a of the container upper portion 408 includes corresponding threads 462 configured to engage the threads 460 in the lower portion 410. To assemble the container 402, the upper and lower container portions 408, 410 are threadingly engaged with each via the respective threads 460, 462 by rotating the upper and lower portions 408, 410 relative to each other.

Referring to FIGS. 32 and 33, a concealment apparatus 400 according to other embodiments is illustrated. In the illustrated embodiment, the upper end 410a of the container lower portion 410 includes a pair of attachment tabs 470 extending therefrom. Each attachment tab 470 includes a distal free end 470a. Each distal free end 470a has a barb 470b that is configured to engage a respective aperture 472 in the container upper portion 408. Each attachment tab 470 is configured such that as a user pushes the upper and lower container portions 408, 410 together, the attachment tabs deflect slightly. The barbs 470b snap into the respective apertures 472 as the tabs return to a non-deflected state. To remove the upper and lower container portions 408, 410 from each other, a user presses the barbs inwardly and then pulls the upper and lower container portions 408, 410 apart.

Figure 42:
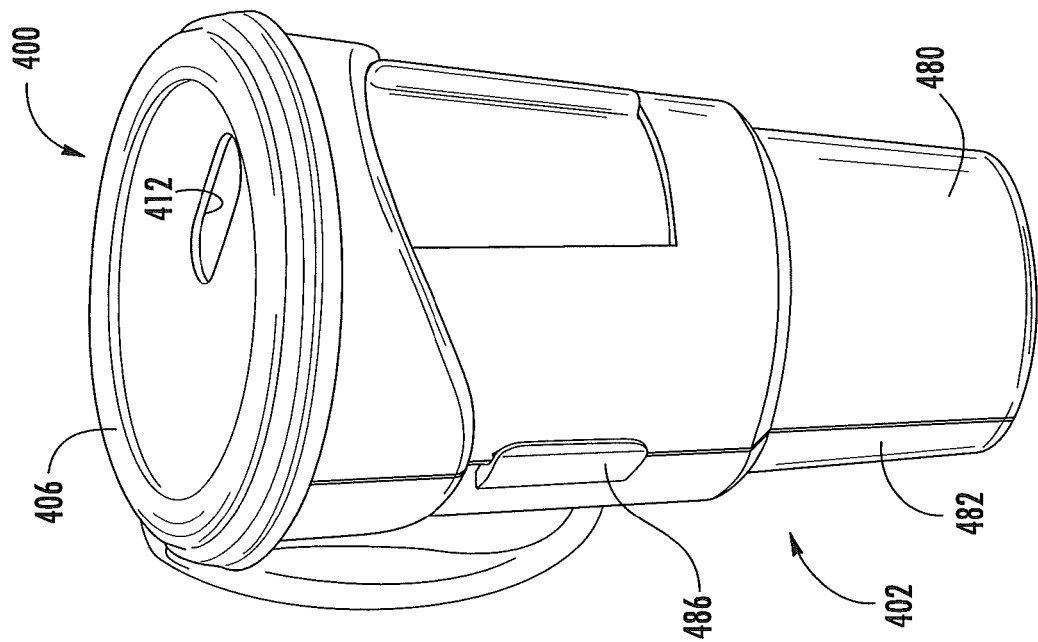
FIGS. 41-43 are perspective views of a concealment apparatus for an ignition interlock device illustrating first and second portions movably connected to each other and that are movable between a closed configuration (FIGS. 41 and 42) and an open configuration (FIG. 43).
Figure 41:
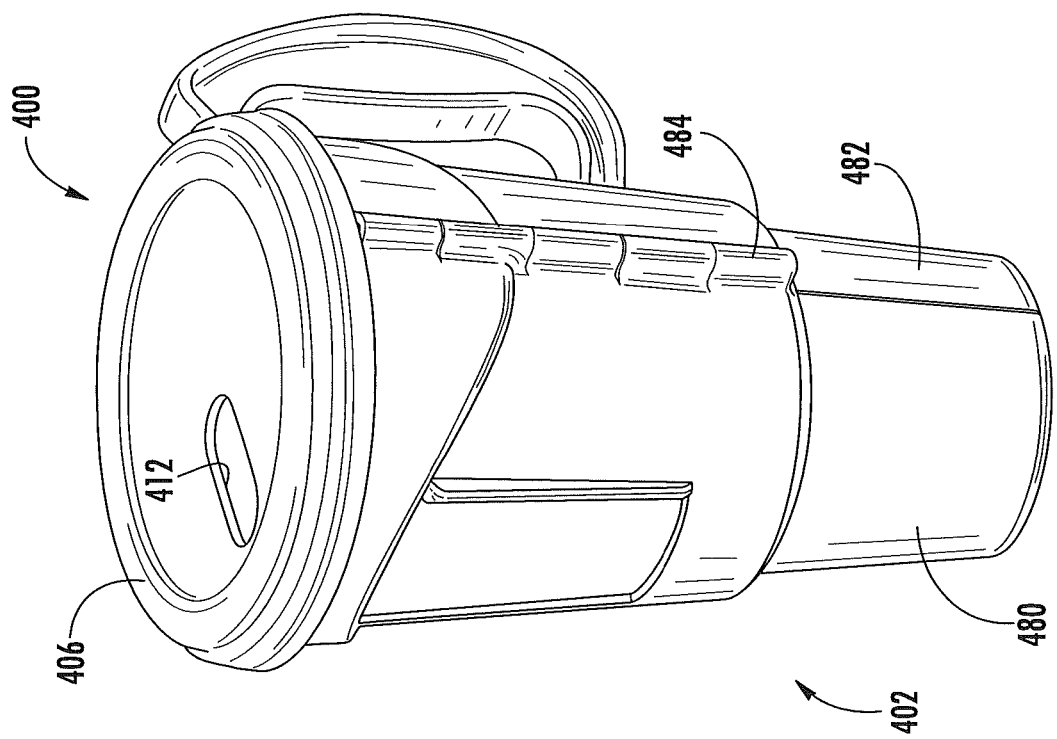
Figure 43:
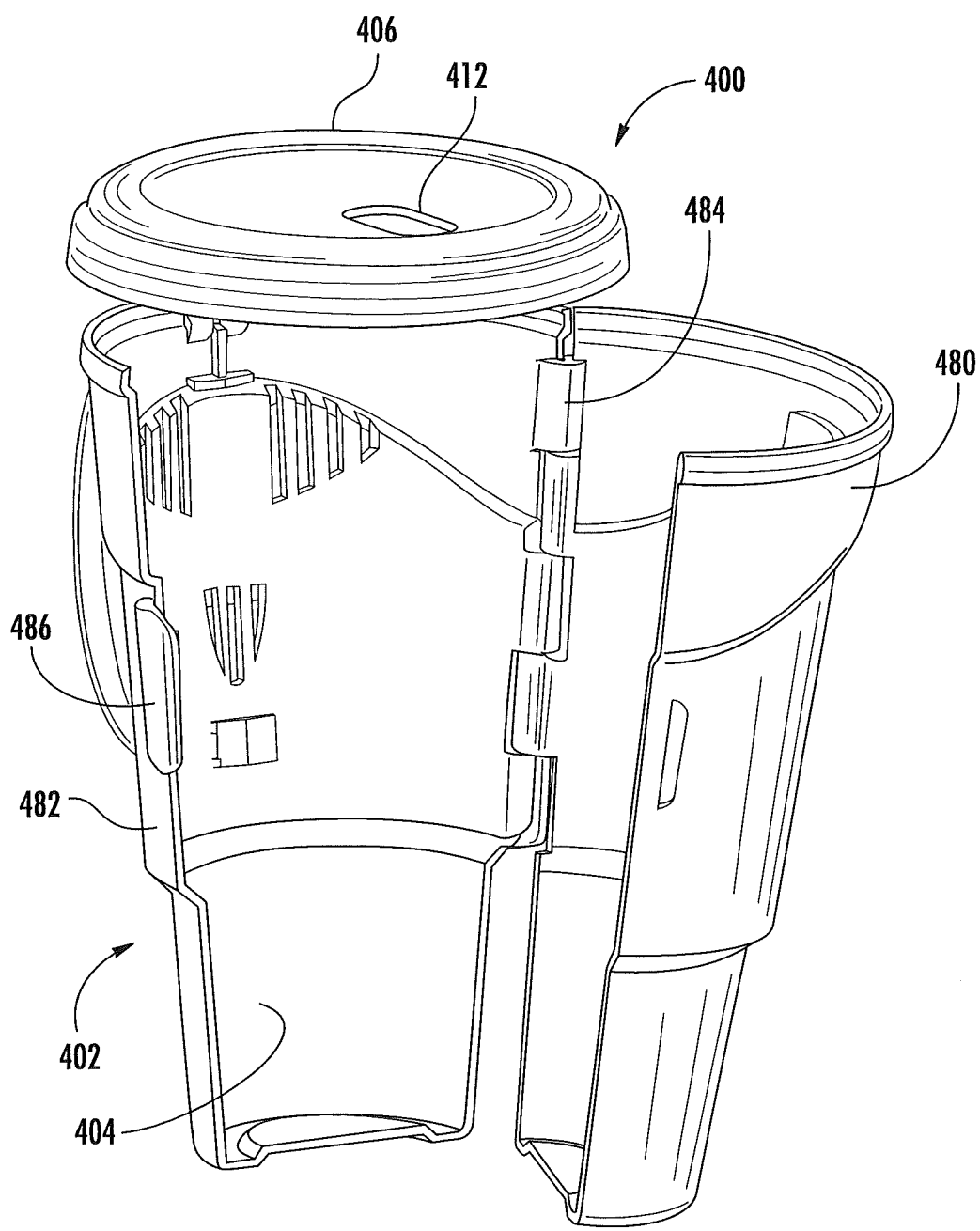

Referring to FIGS. 41-43, a concealment apparatus 400 according to other embodiments of the present invention is illustrated. The illustrated apparatus 400 includes a container 402 having first and second portions 480, 482 movably connected together. In the illustrated embodiment, the first and second portions 480, 482 are movably connected by a hinge 484 and are movable between an open configuration (FIG. 43) and a closed configuration (FIGS. 41 and 42). When the first and second portions 480, 482 are in the closed position (FIG. 43), a cavity 404 is defined therein for receiving and concealing an ignition interlock device. A latch mechanism 486 is configured to maintain the first and second portions 480, 482 in the closed configuration. However, embodiments of the present invention are not limited to the illustrated hinged configuration of FIGS. 41-43. In other embodiments the container 402 may have upper and lower portions (e.g., upper and lower portions 408, 410, FIG. 19) that are movably connected via a hinge or other arrangement.

In some embodiments of the present invention, as illustrated in FIGS. 25-33, the container 402 of a concealment apparatus 400 may include a door 402d that is movably secured to the container 402 and is configured to be movable between open and closed positions. When in an open position, a screen or display of an ignition interlock device 140 within the container cavity 404 can be viewed through a window 402w in the container 402.

Referring to FIGS. 34-37, an extension apparatus 500 for a mouthpiece 140m of an ignition interlock device 140 is illustrated. The extension apparatus 500 includes a tube 502 having an elongate first portion 504 terminating at a first open end 504a and a second portion 506 terminating at a second open end 506a. The elongate first portion 504 and the second portion 506 are substantially orthogonal to each other such that the extension apparatus 500 is substantially "L"-shaped. In some embodiments of the present invention, the elongate first portion 504 of the extension apparatus has a length that is between about one and five times a length of the second portion 506. The extension apparatus 500 allows the mouthpiece of any type of ignition interlock device to be accessible through the elongated through hole 412 in the lid 406 of the various concealment apparatus 400 illustrated in FIGS. 19-33 and 38-43.

An axial direction $A_1$ defined by the elongate first portion 504 is substantially transverse to an axial direction $A_2$ defined by the second portion 506. The second portion 506 is configured to receive a mouthpiece 140m of an ignition interlock device 140 inserted through the second open end 506a, and the elongate first portion 504 is configured to receive exhaled breath therethrough from a person via the open end 504a. The illustrated extension apparatus 500 includes a flange 508 that extends circumferentially around the second portion open end 506a. The flange 508 is configured to engage a flange 140f on a mouthpiece 140m of an ignition interlock device.

Figure 34:
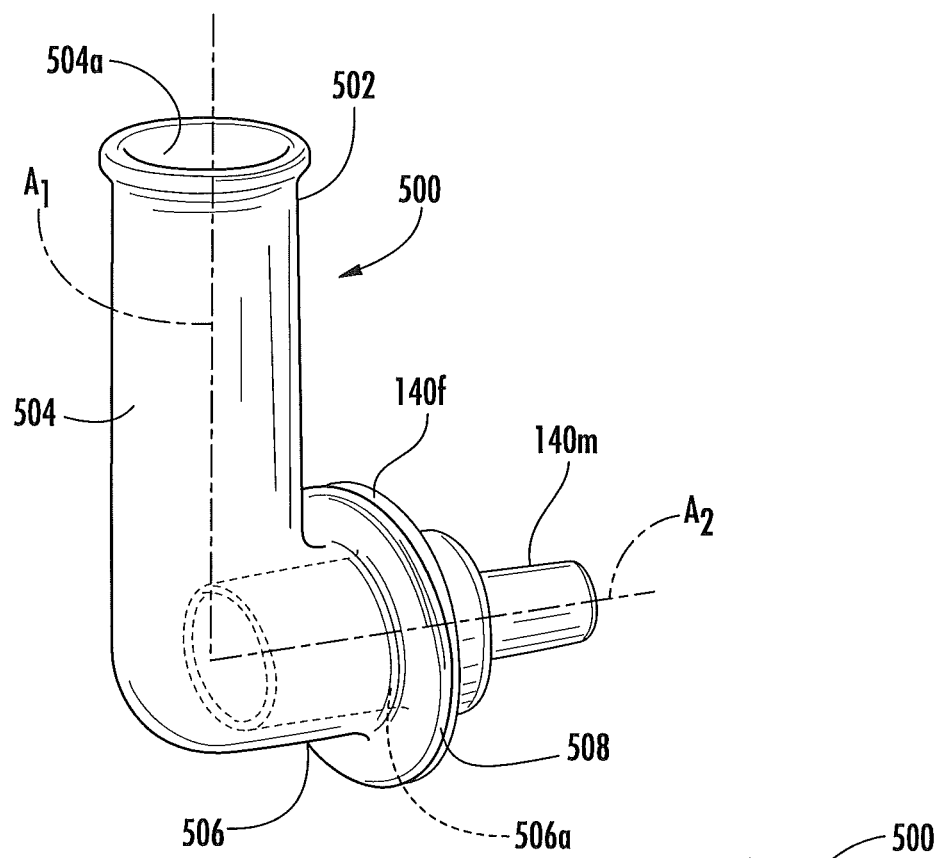
FIGS. 34-37 are perspective views of an extension apparatus for a mouthpiece of an ignition interlock device, according to some embodiments of the present invention.
Figure 35:
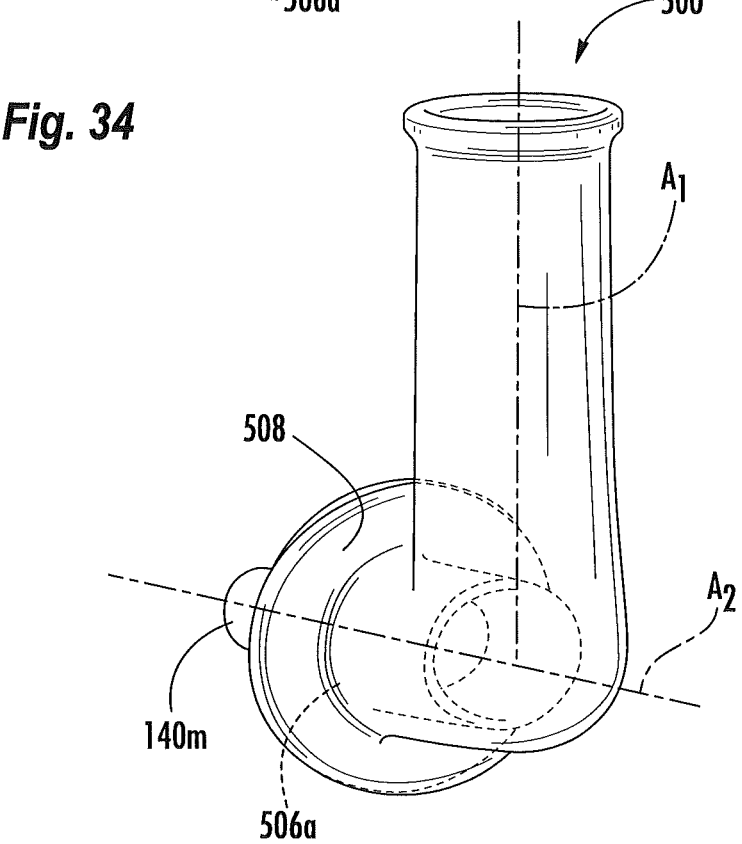
Figure 36:
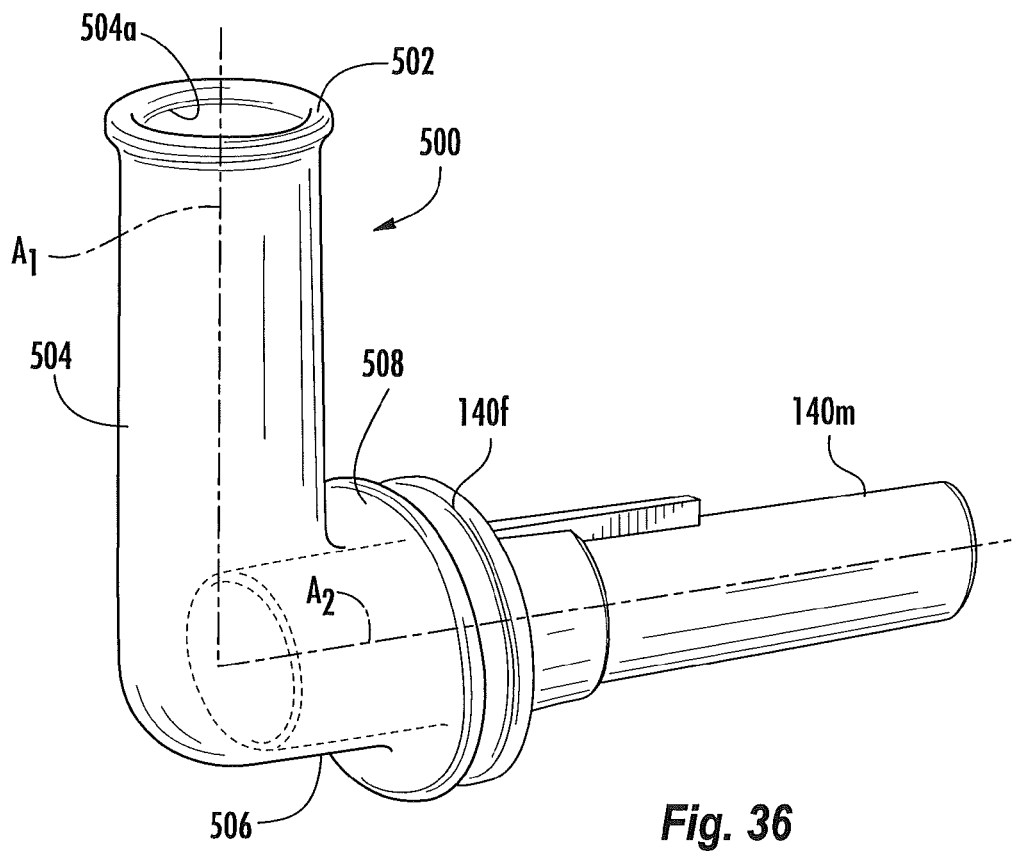
Figure 37:
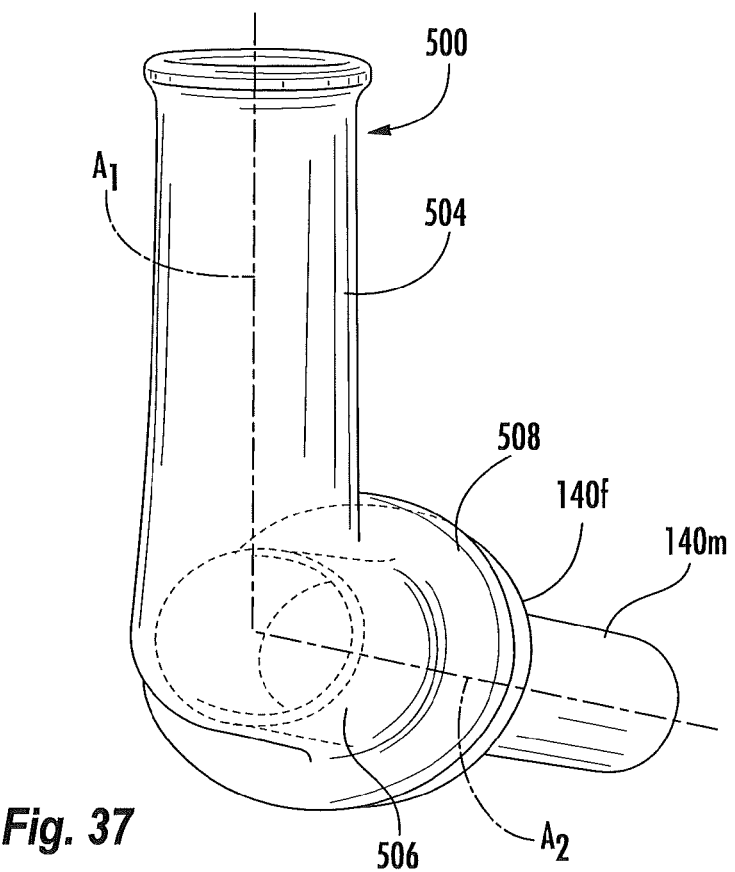

In some embodiments of the present invention, the tube 502 is formed from a resilient material, such as rubber, silicone, etc. The resiliency of the tube 502 allows the second portion opening 506a to be able to be snugly inserted around a mouthpiece 140m of various shapes and configurations. FIGS. 34 and 35 illustrate the extension apparatus 500 secured to a first type of mouthpiece associated with a particular ignition interlock device. FIGS. 36 and 37 illustrate the extension apparatus 500 secured to a second type of mouthpiece associated with another type of ignition interlock device. In other embodiments of the present invention, the tube 502 can be formed from a non-resilient material. Embodiments of the present invention are not limited to any particular type of material for the tube 502.

Figure 38:
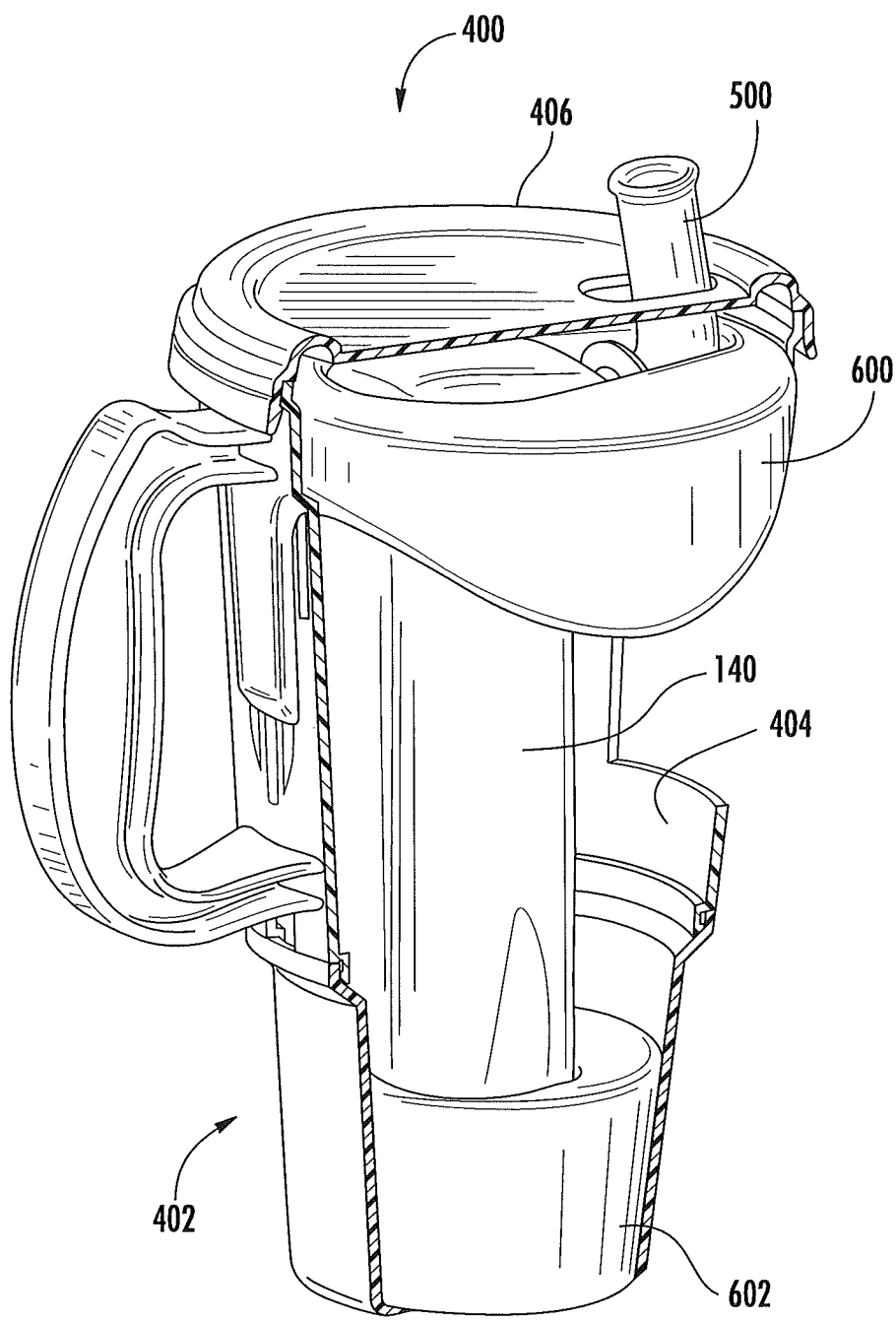
FIGS. 38-40 are fragmentary perspective views of a concealment apparatus for an ignition interlock device and illustrating various insert members for engaging and supporting an ignition interlock device concealed therewithin, according to various embodiments of the present invention.
Figure 39:
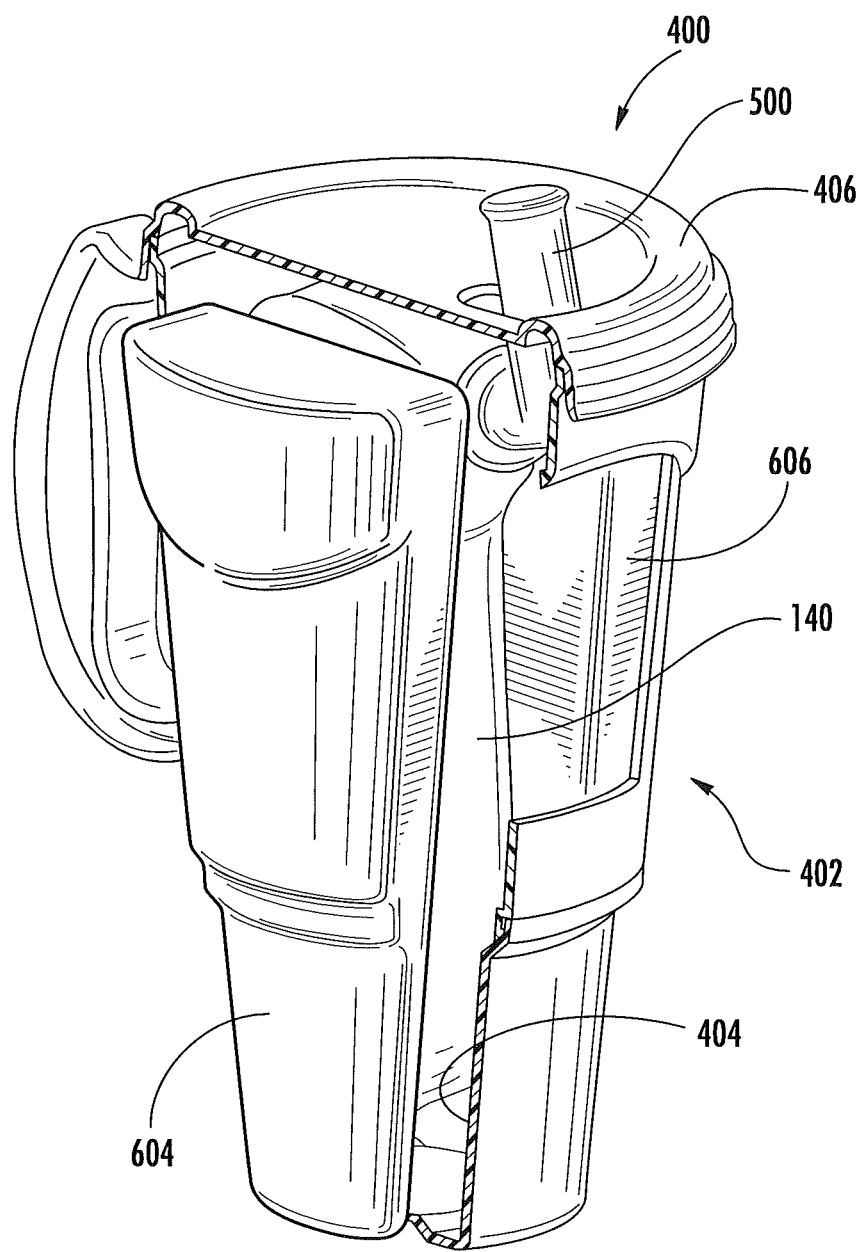
Figure 40:
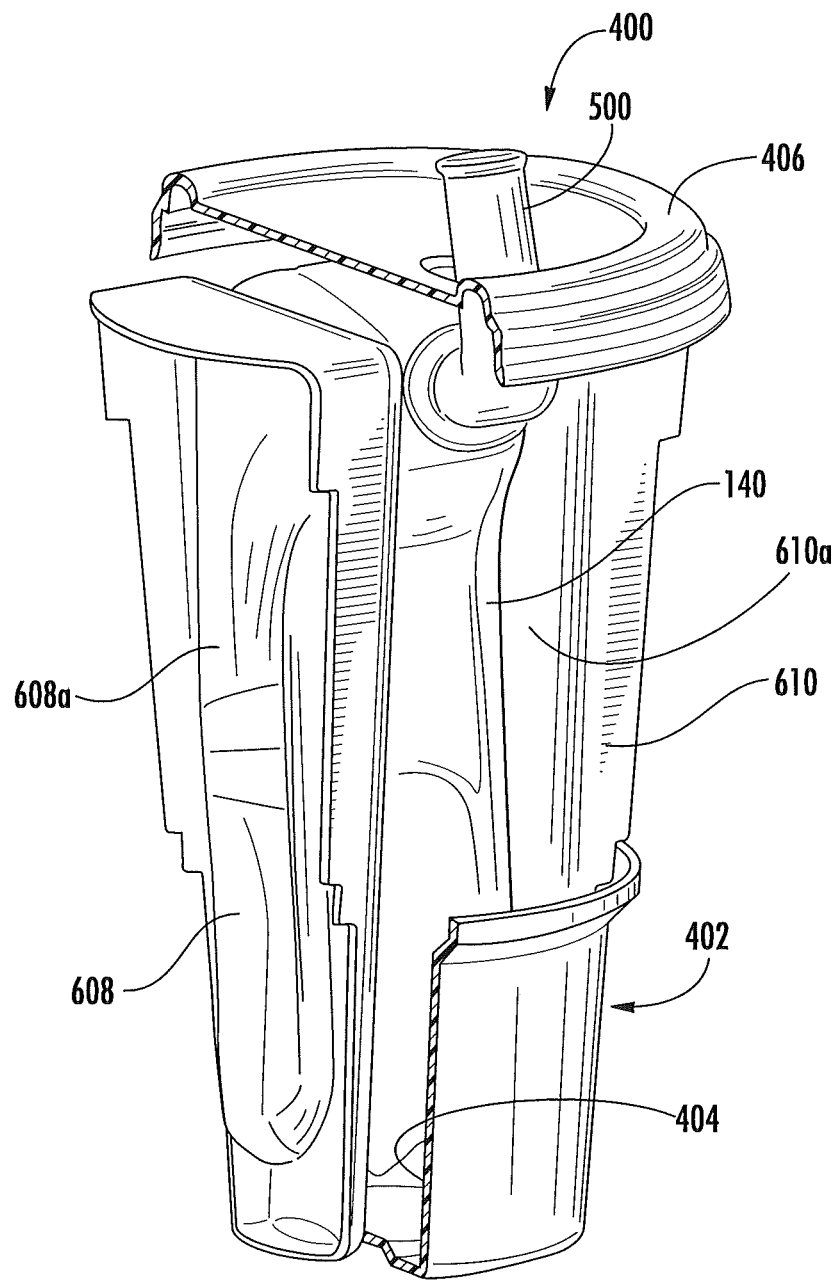

Referring now to FIGS. 38-40, a concealment apparatus 400 according to some embodiments of the present invention may include one or more insert members within the cavity 404 to engage and support an ignition interlock device 140. These insert members are configured to be snugly engaged between an ignition interlock device and the interior of a container 402 to prevent the ignition interlock device 140 from moving around and to protect the ignition interlock device 140 from vibrations, as well as from damage due to impacts, etc.

In some embodiments of the present invention, as illustrated in FIG. 38, first and second insert members 600, 602 are disposed within the cavity 404. The first insert member 600 is configured to engage an upper portion of the ignition interlock device 140, and the second insert member 602 is configured to engage a lower portion of the ignition interlock device 140, as illustrated. In other embodiments, first and second insert members 604, 606 (FIG. 39) are configured to engage respective side portions of an ignition interlock device 140 within the cavity 404 of a concealment apparatus 400. In some embodiments of the present invention, one or more insert members 608, 610 (FIG. 40) may have a formed surface 608a, 610a matched to a shape of a portion of an ignition interlock device 140.

The insert members 600-610 may be formed from various materials including, but not limited to, foam, plastic, etc. An exemplary foam material that can be utilized is an open cell foam. Moreover, insert members 600-610 may have various shapes, sizes and configurations. In some embodiments of the present invention, one or more insert members 600-610 may be permanently secured to an interior wall of the container 42. In some embodiments of the present invention, one or more insert members 600-610 may have a shape corresponding to a shape of a portion of the cavity 404 within the container 402.

Typically, the insert members 600-610 do not completely surround or encase an ignition interlock device 140 for heat dissipation reasons.

Figure 45:
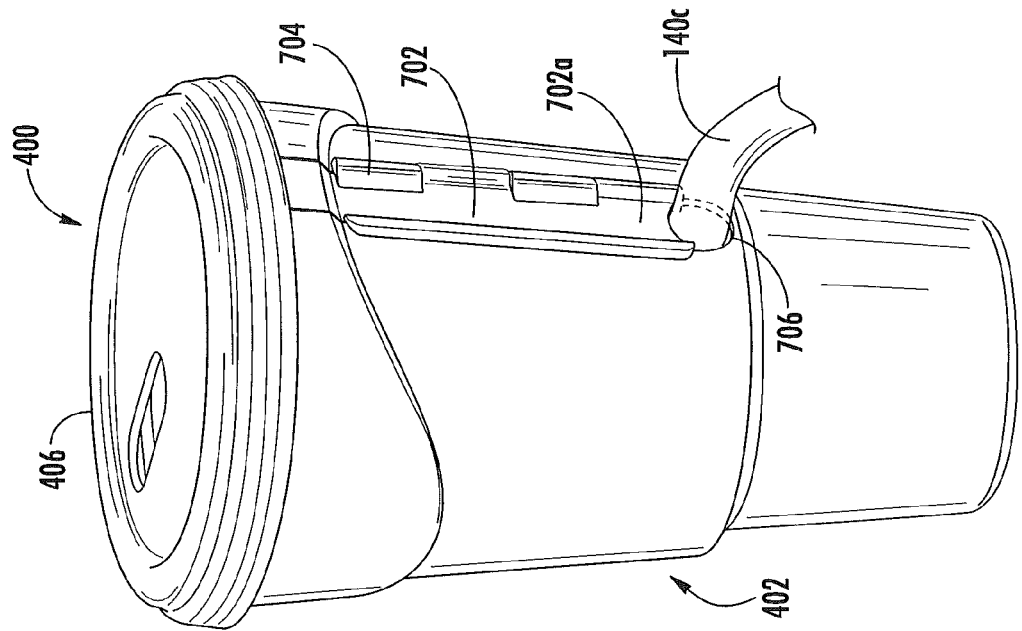
FIGS. 44 and 45 are perspective views of a concealment apparatus for an ignition interlock device illustrating a slot for receiving a cord of an ignition interlock device and a panel operably associated with the slot, according to some embodiments of the present invention.
Figure 44:
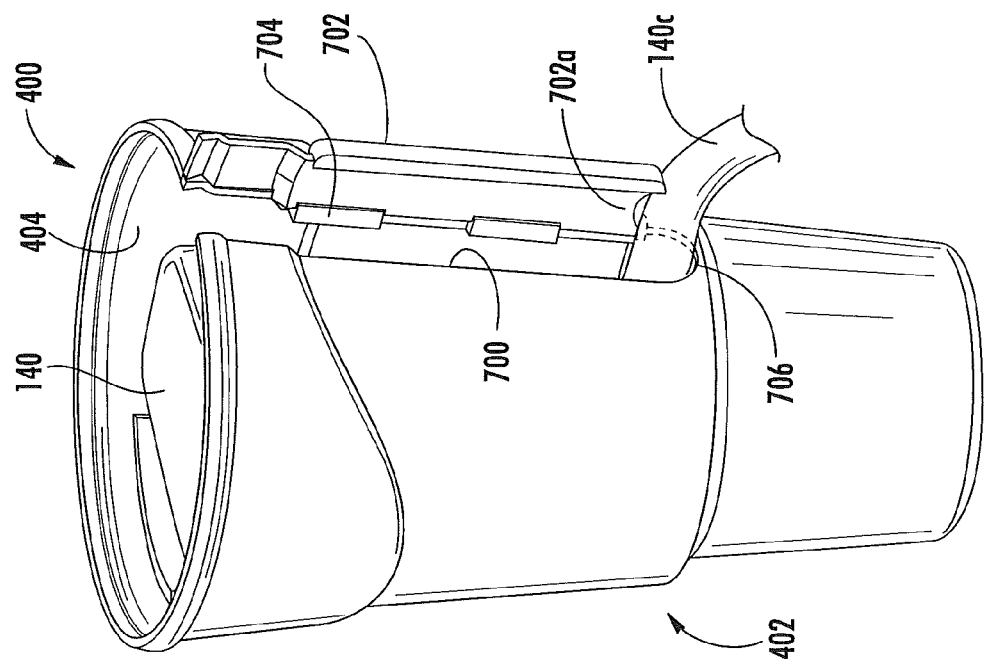
Figure 46:
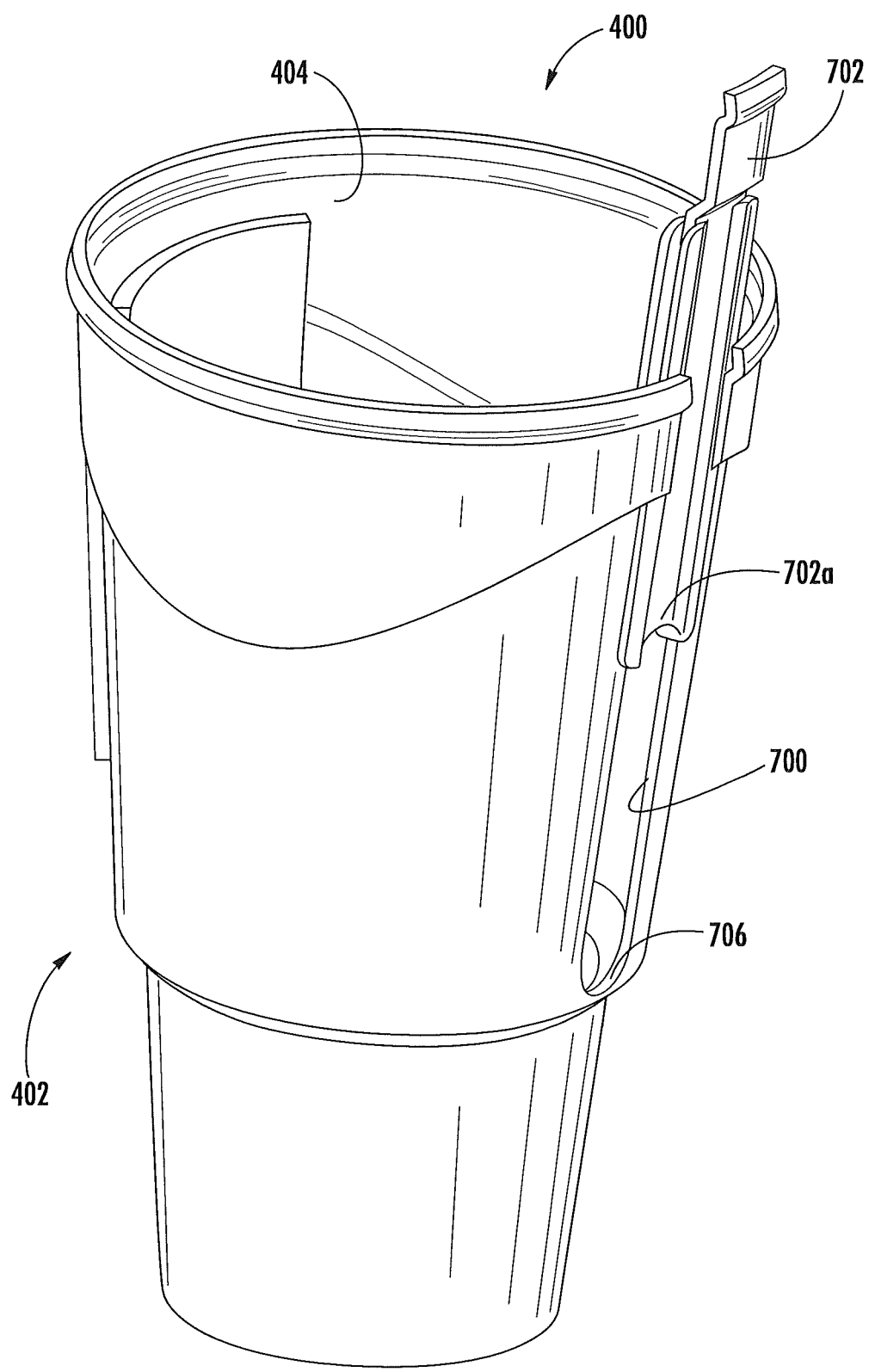
FIG. 46 is a perspective view of a concealment apparatus for an ignition interlock device illustrating a slot for receiving a cord of an ignition interlock device and a panel operably associated with the slot, according to some embodiments of the present invention.

Referring now to FIGS. 44-46, a concealment apparatus 400, according to some embodiments of the present invention, may include an elongated slot 700 configured to receive the electrical cord 140c of an ignition interlock device 140 disposed within the concealment apparatus 400. In the illustrated embodiment, the elongated slot 700 extends from the container open upper end 402a to an intermediate location of the container 402. A panel 702 is operably associated with the slot 700 and is movable between an open position providing access to the slot 700 and a closed position preventing access to the slot 700. For example, in FIG. 44, the panel 702 is movably secured to the container 402 via a hinge 704 and is movable between open (FIG. 44) and closed (FIG. 45) positions. The bottom portion 702a of the panel 702 is shaped to form an aperture 706 with the slot 700 when the panel 702 is in the closed position, as illustrated in FIG. 45. A user removes the lid 406 from the container 402, as illustrated in FIG. 44, and places an ignition interlock device 140 within the cavity 404 of the container 402. With the panel 702 open, a cord 140c from the ignition interlock device 140 is placed within the slot 700 and moved to the bottom of the slot 700. The panel 702 is then closed and the cord 140c extends from the container 402 via aperture 706.

FIG. 46 illustrates a concealment apparatus 400 according to other embodiments of the present invention wherein a panel 702 is slidably associated with an elongated slot 700. A user removes the panel 702 from the slot 700, inserts an ignition interlock device 140 within the cavity 404 of the container 402, and places a cord 140c from the ignition interlock device 140 within the slot 700, as described above. The panel 702 is then slid back to a closed position such that the cord 140c extends from the container 402 via aperture 706 formed by the slot 700 and the lower portion 702a of the panel 702.

Figure 47:
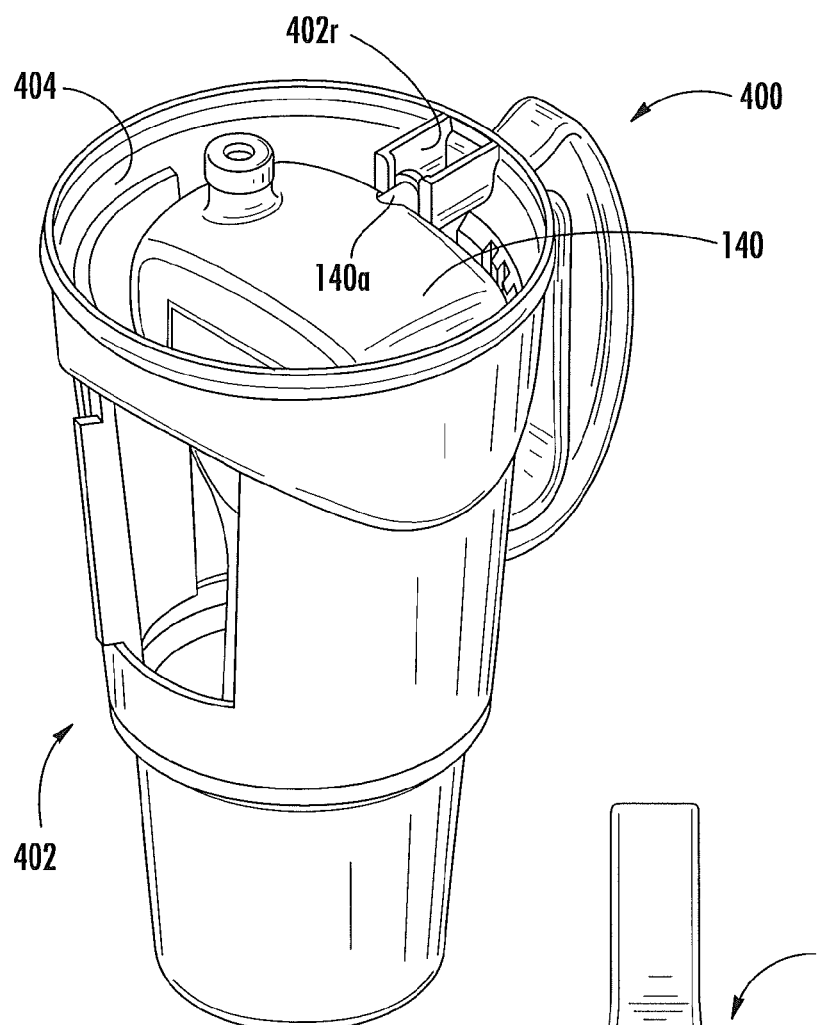
FIG. 47 is a perspective view of a concealment apparatus for an ignition interlock device with the lid removed and illustrating a first member within the cavity that is configured to removably receive a second member extending from an ignition interlock device so as to suspend and hold the ignition interlock device within the cavity, according to some embodiments of the present invention.
Figure 48:
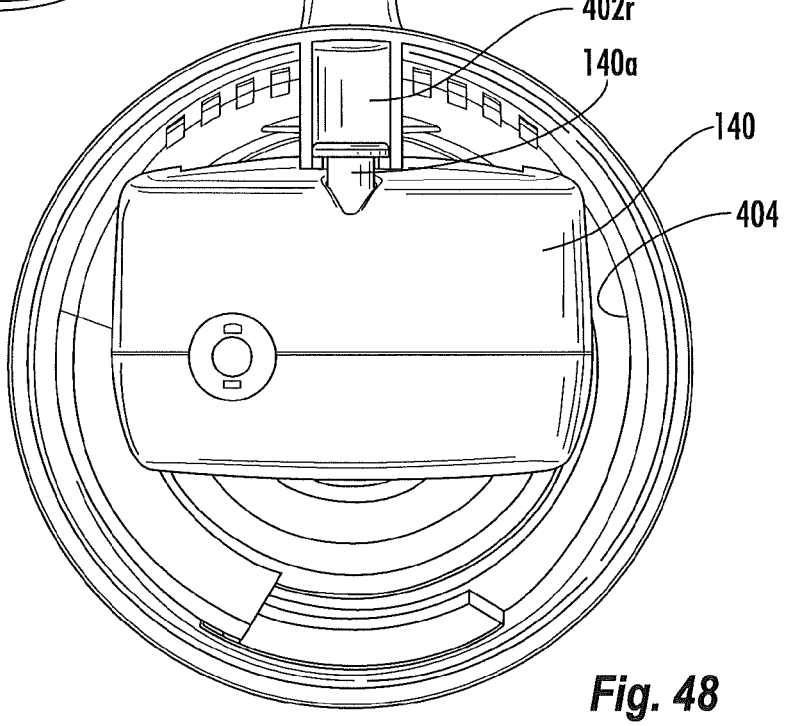
FIG. 48 is top plan view of the concealment apparatus of FIG. 47.

FIGS. 47 and 48 illustrate a concealment apparatus 400 according to other embodiments of the present invention. The container 402 includes a member 402r within the cavity 404 that is configured to removably receive member 140a extending from an ignition interlock device 140 so as to suspend and hold the ignition interlock device 140 within the cavity 404. In the illustrated embodiment, the member 402r is a U-shaped hanger member that is configured to removably receive a corresponding member 140a extending from the ignition interlock device 140 so that the ignition interlock device 140 is suspended and held inside the concealment apparatus 400 and will not move or rotate. In other embodiments of the present invention, the lid 406 may include a member (e.g., a U-shaped hanger member as illustrated in FIGS. 47-48) that is configured to removably receive a member extending from an ignition interlock 140 device so as to suspend and hold the ignition interlock device 140 within the cavity 404. Embodiments of the present invention are not limited to the illustrated shape or configuration of member 402r or member 140a. Receiving member 402r and ignition interlock device member 140a can have various shapes and configurations without limitation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A concealment apparatus for an ignition interlock device comprising:
   a container defining a cavity with an open upper end, wherein the cavity is configured to receive an ignition interlock device, and wherein the container comprises a sidewall that includes a window for viewing a screen of the ignition interlock device;
   a door slidably secured to the container sidewall and movable between open and closed positions, wherein the screen of the ignition interlock device within the container cavity can be viewed through the window when the door is in the open position; and
   a lid covering the open upper end, wherein the lid has an elongated through hole for one of a straw member and a mouth piece of an ignition interlock device within the container cavity.

2. The concealment apparatus of claim 1, wherein the container comprises first and second portions secured together to define the cavity.

3. The concealment apparatus of claim 2, wherein the first and second portions comprise respective upper and lower portions.

4. The concealment apparatus of claim 3, wherein the container lower portion comprises an open upper end configured to be removably secured to an open lower end of the container upper portion.

5. The concealment apparatus of claim 2, wherein the first and second portions are movably connected to each other and are movable between an open configuration and a closed configuration.

6. The concealment apparatus of claim 5, further comprising a latch mechanism configured to maintain the first and second portions in the closed configuration.

7. The concealment apparatus of claim 1, wherein the door is slidably secured to an inside surface of the container, and wherein the door has an arcuate configuration that matches an arcuate configuration of the container inside surface.

8. The concealment apparatus of claim 1, wherein the container comprises an elongated slot extending from the open upper end, and a panel operably associated with the slot that is movable between an open position providing access to the slot and a closed position preventing access to the slot, wherein the slot is configured to receive a cord of an ignition interlock device placed within the container cavity when the panel is in the open position, and wherein the panel cooperates with the slot to form an aperture through which the cord extends from the container when the panel is in the closed position.

9. The concealment apparatus of claim 8, wherein the panel is slidably associated with the slot.

10. The concealment apparatus of claim 8, wherein the panel is hinged to the container.

11. The concealment apparatus of claim 1, further comprising at least one insert member snugly engaged within the cavity, wherein the at least one insert member is configured to engage and support an ignition interlock device within the container cavity.

12. The concealment apparatus of claim 11, wherein the at least one insert member comprises first and second insert members.

13. The concealment apparatus of claim 12, wherein the first insert member is configured to engage an upper portion of the ignition interlock device, and wherein the second insert member is configured to engage a lower portion of the ignition interlock device.

14. The concealment apparatus of claim 12, wherein the first and second insert members are configured to engage respective side portions of the ignition interlock device.

15. The concealment apparatus of claim 1, wherein the container cavity comprises at least one wall configured to engage and support an ignition interlock device within the container cavity.

16. The concealment apparatus of claim 1, wherein the container comprises a first member within the cavity that is configured to removably receive a second member extending from an ignition interlock device so as to suspend and hold the ignition interlock device within the cavity.

17. The concealment apparatus of claim 1, wherein the lid comprises a first member that is configured to removably receive a second member extending from an ignition interlock device so as to suspend and hold the ignition interlock device within the cavity.

18. A concealment apparatus for an ignition interlock device comprising:
    a container comprising first and second portions removably secured together to define a cavity with an open upper end, wherein the cavity is configured to receive an ignition interlock device, and wherein the container comprises a sidewall that includes a window for viewing a screen of the ignition interlock device;
    a door slidably secured to the container sidewall and movable between open and closed positions, wherein the screen of the ignition interlock device within the container cavity can be viewed through the window when the door is in the open position; and
    a lid covering the open upper end.

19. The concealment apparatus of claim 18, wherein the first and second portions comprise respective upper and lower portions.

20. The concealment apparatus of claim 19, wherein the container lower portion comprises an open upper end configured to be removably secured to an open lower end of the container upper portion.

21. The concealment apparatus of claim 20, wherein the upper end of the container lower portion threadingly engages the lower end of the container upper portion.

22. The concealment apparatus of claim 20, wherein the upper end of the container lower portion matingly engages the lower end of the container upper portion.

23. The concealment apparatus of claim 18, wherein the first and second portions are movably connected to each other and are movable between an open configuration and a closed configuration.

24. The concealment apparatus of claim 18, wherein the door is slidably secured to an inside surface of the container, and wherein the door has an arcuate configuration that matches an arcuate configuration of the container inside surface.

25. The concealment apparatus of claim 18, wherein the container comprises an elongated slot extending from the open upper end, and a panel operably associated with the slot that is movable between an open position providing access to the slot and a closed position preventing access to the slot, wherein the slot is configured to receive a cord of an ignition interlock device placed within the container cavity when the panel is in the open position, and wherein the panel cooperates with the slot to form an aperture through which the cord extends from the container when the panel is in the closed position.

26. The concealment apparatus of claim 18, further comprising at least one insert member snugly engaged within the cavity, wherein the at least one insert member is configured to engage and support an ignition interlock device within the container cavity.

27. The concealment apparatus of claim 18, wherein the container cavity comprises at least one wall configured to engage and support an ignition interlock device within the container cavity.

28. The concealment apparatus of claim 18, wherein the container comprises a first member within the cavity that is configured to removably receive a second member extending from an ignition interlock device so as to suspend and hold the ignition interlock device within the cavity.

29. The concealment apparatus of claim 28, wherein the lid comprises a first member that is configured to removably receive a second member extending from an ignition interlock device so as to suspend and hold the ignition interlock device within the cavity.

\* \* \* \* \*

UNITED STATES PATENT AND TRADEMARK OFFICE
CERTIFICATE OF CORRECTION

| | |
|---|---|
| PATENT NO. | : 8,701,814 B2 |
| APPLICATION NO. | : 13/565514 |
| DATED | : April 22, 2014 |
| INVENTOR(S) | : Saunders |

It is certified that error appears in the above-identified patent and that said Letters Patent is hereby corrected as shown below:

<u>In the Claims:</u>
Column 22, Claim 29, Line 38: Please correct "apparatus of claim 28,"
to read -- apparatus of claim 18, --

Signed and Sealed this
Fourteenth Day of October, 2014

Michelle K. Lee
*Deputy Director of the United States Patent and Trademark Office*